Sept. 9, 1941.  W. L. BARROW  2,255,042
ELECTROMAGNETIC HORN
Filed Jan. 3, 1939  10 Sheets-Sheet 1
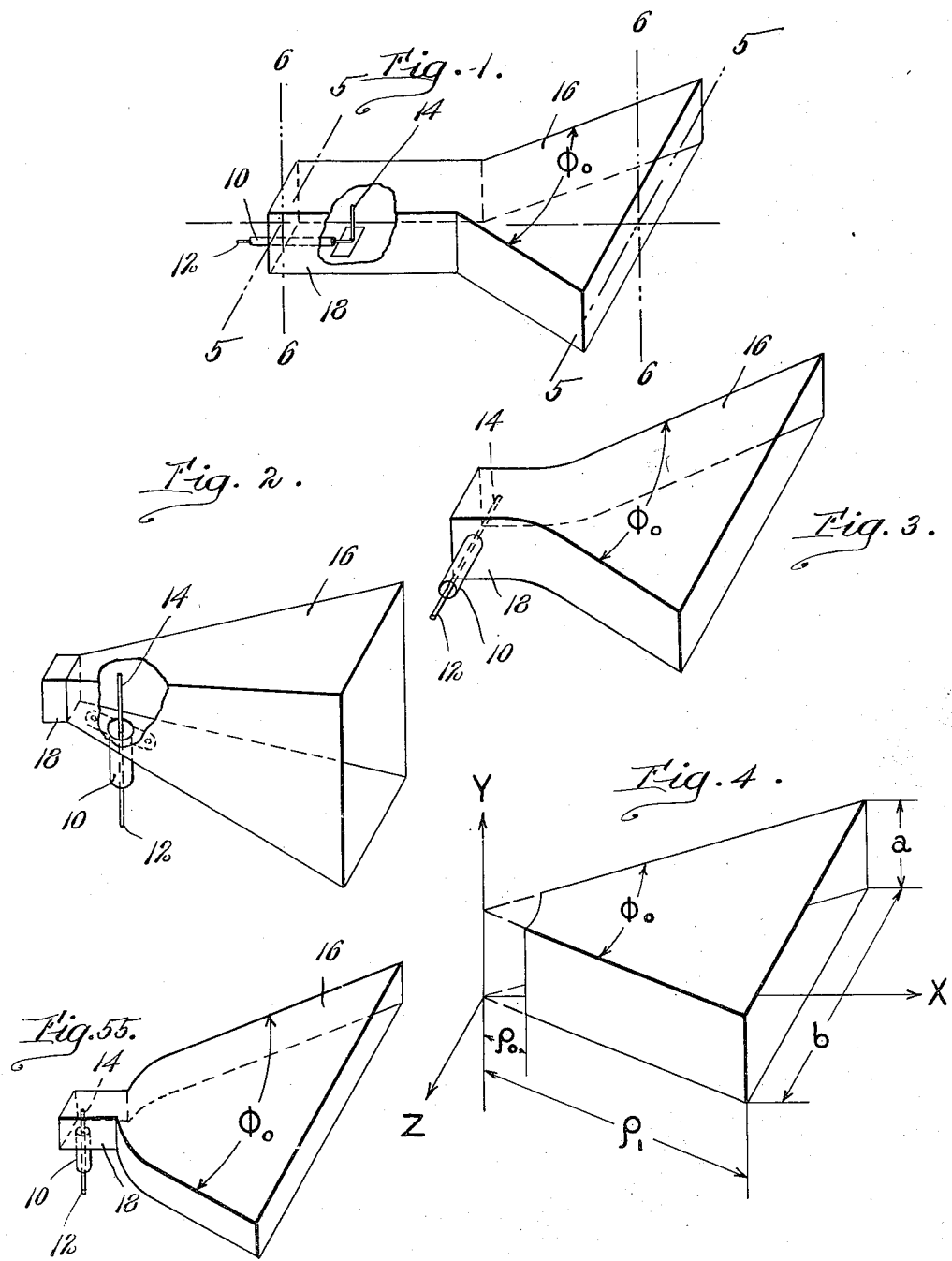
INVENTOR
WILMER L. BARROW
BY
David Rines
ATTORNEY Sept. 9, 1941.  W. L. BARROW  2,255,042
ELECTROMAGNETIC HORN
Filed Jan. 3, 1939  10 Sheets-Sheet 2
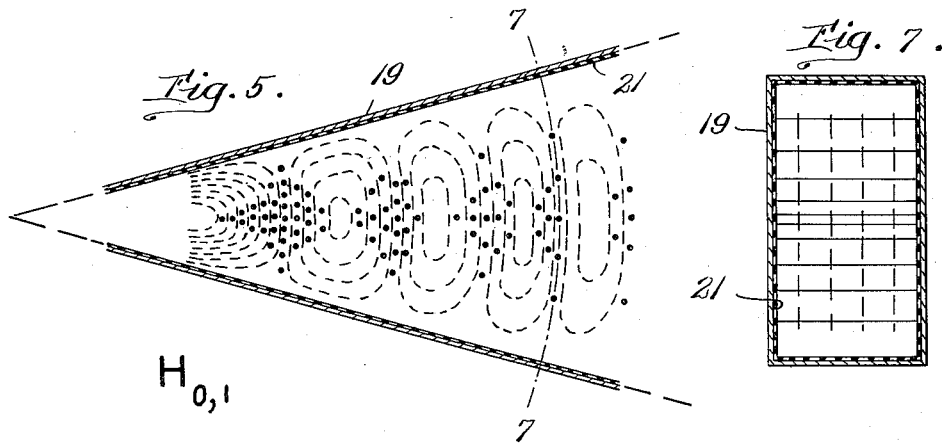
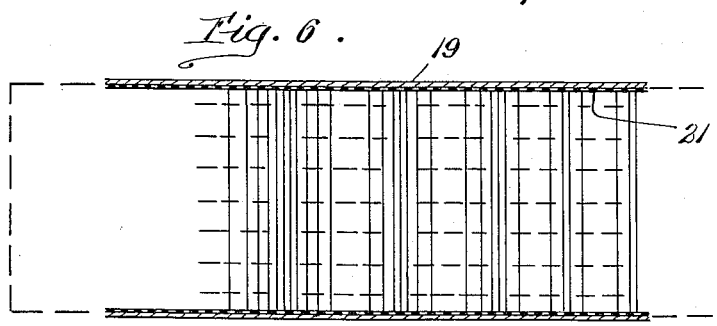
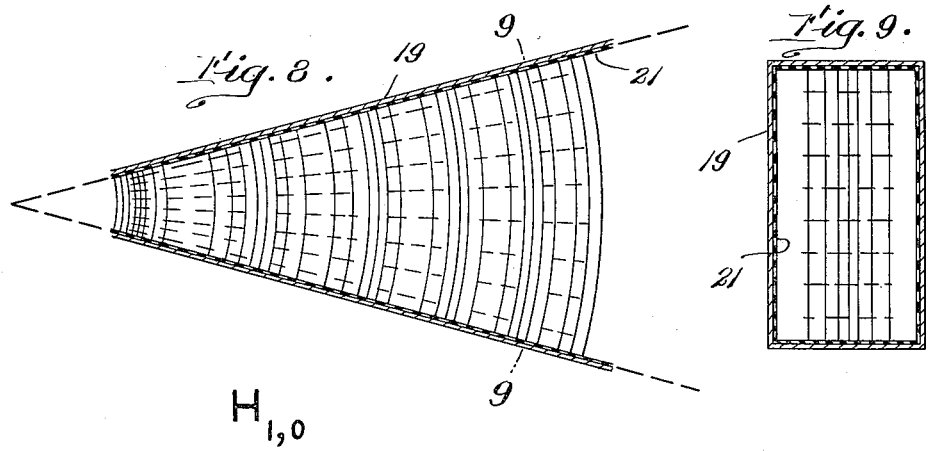
INVENTOR
WILMER L. BARROW
BY
ATTORNEY

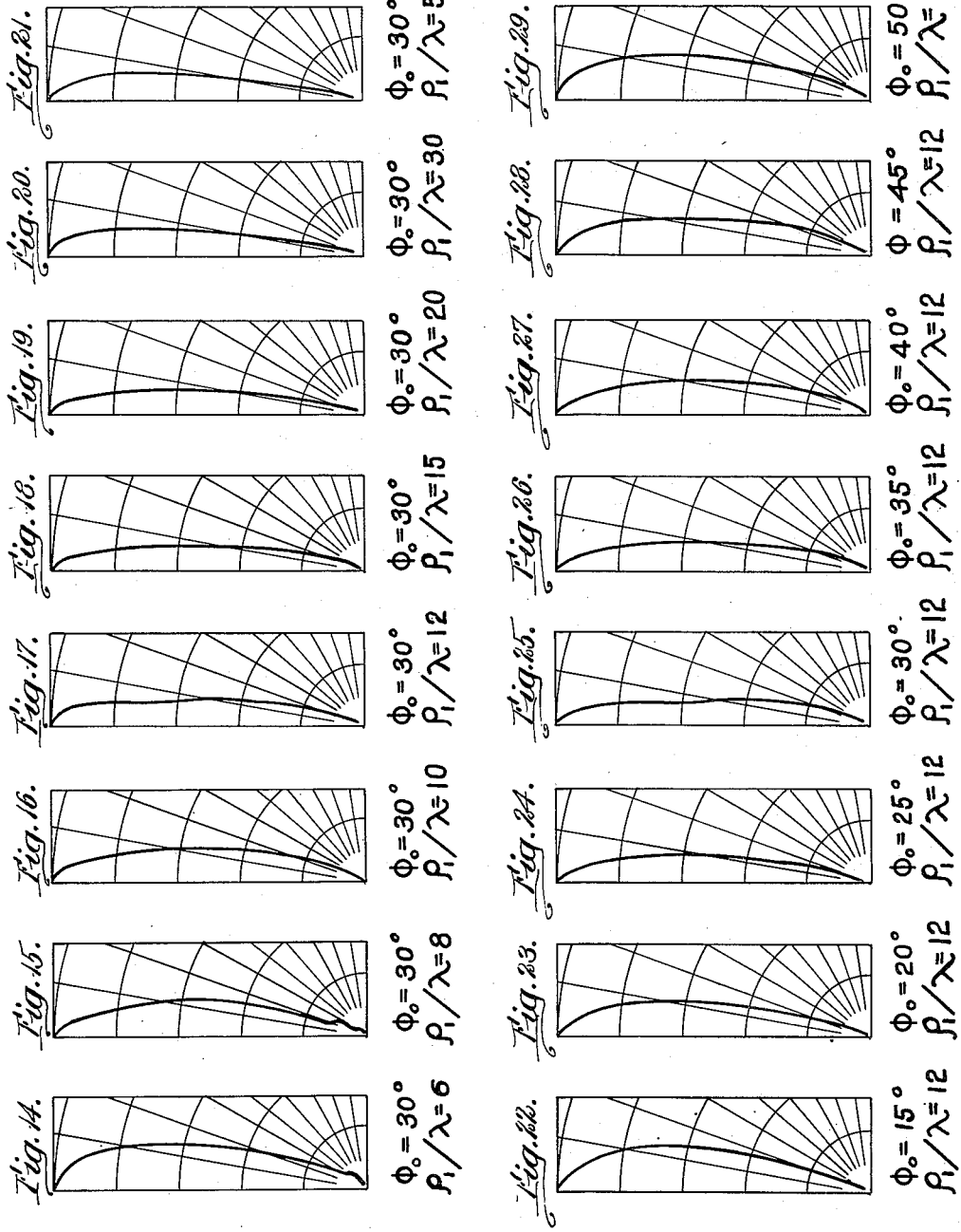

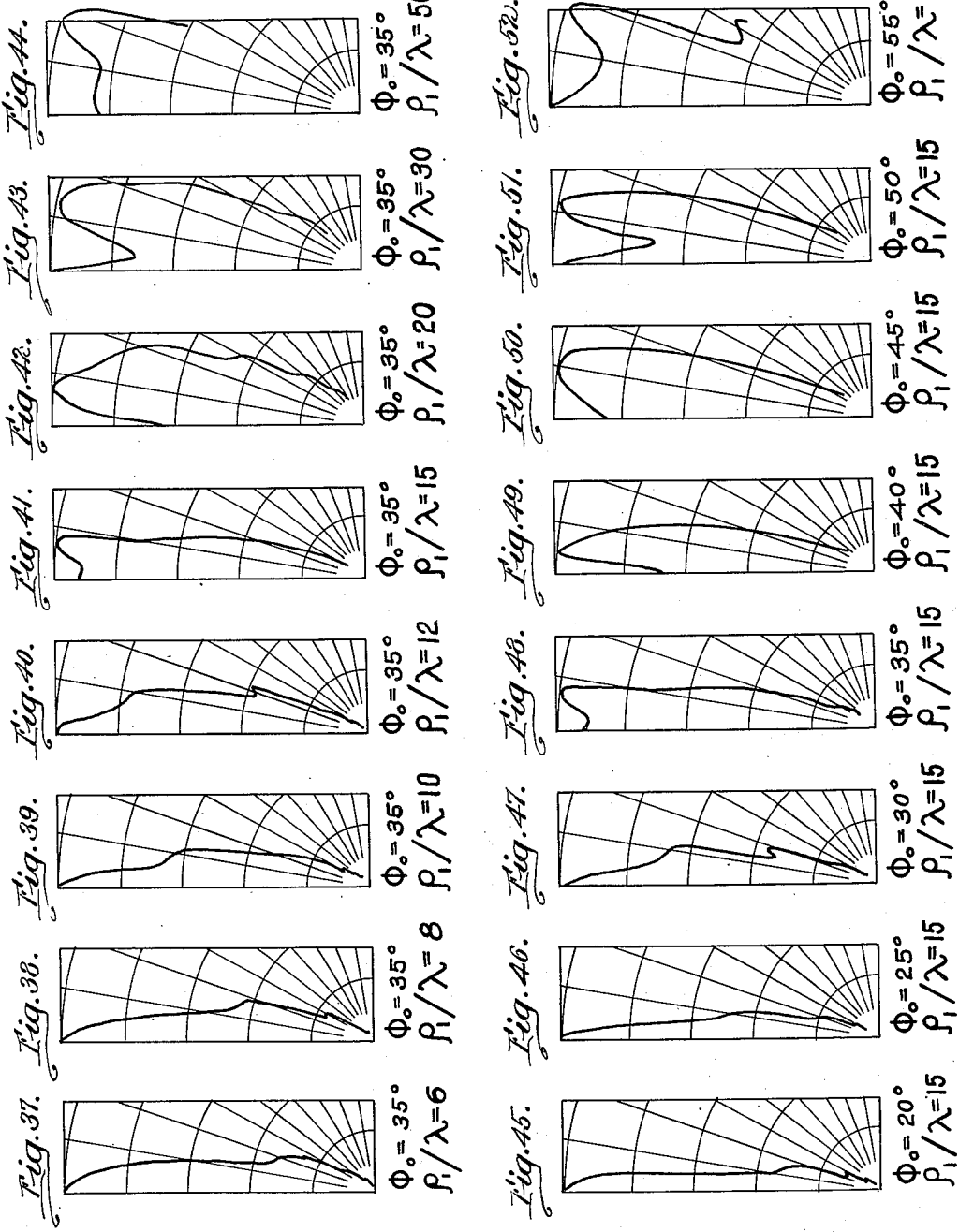

INVENTOR
WILMER L. BARROW
BY
ATTORNEY

Inventor.
WILMER L. BARROW

Patented Sept. 9, 1941

2,255,042

UNITED STATES PATENT OFFICE 2,255,042

REISSUED

ELECTROMAGNETIC HORN

Wilmer Lanier Barrow, Newton, Mass., assignor to Research Corporation, New York, N. Y., a corporation of New York

MAY 25 1948

Application January 3, 1939, Serial No. 249,005

56 Claims. (Cl. 250—11)

The present invention relates to electromagnetic horns.

An object of the present invention is to improve upon electromagnetic horns, particularly of sectoral or pyramidal shape, with the aid of which it shall be possible to obtain a beam of specified angular spread.

Another object is to provide a horn of the above-described character the beam of which shall be sharp.

A further object is to provide an optimum sharpness of beam.

Another object is to concentrate the radiant energy of the beam in one direction.

Still a further object is to provide an electromagnetic horn of the above-described character the beam diagram or radiation pattern of which shall have a smooth contour.

A further object is to provide the said smooth contour with a single peak representing a single maximum electric intensity.

Another object is to provide an electromagnetic horn the beam of which shall have a specified power gain.

Still another object is to render the said gain a maximum.

Another object is to provide a horn having a predetermined radiation performance.

A further object is to provide quantitative curves to facilitate the designs of such horns.

Other and further objects will be described hereinafter and will be particularly pointed out in the appended claims.

The invention will now be described in connection with the accompanying drawings, in which Fig. 1 is a perspective, partly broken away, of a sectoral electromagnetic horn embodying the invention and fed by a hollow-pipe line;

Figs. 2 and 3 are similar perspectives of modifications;

Fig. 4 is a diagrammatic perspective of a sectoral horn, disposed in Cartesian and cylindrical systems of coordinates, and carrying symbols useful in describing the invention;

Figure 10:
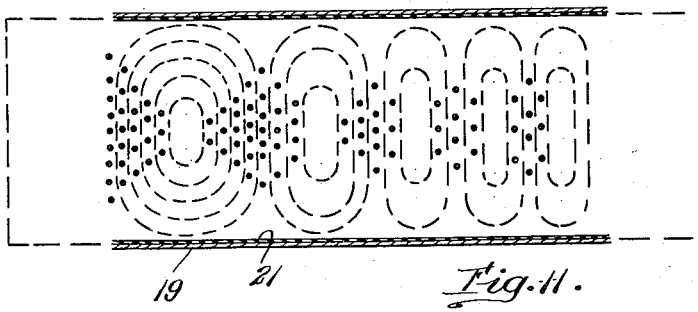
Figure 13:
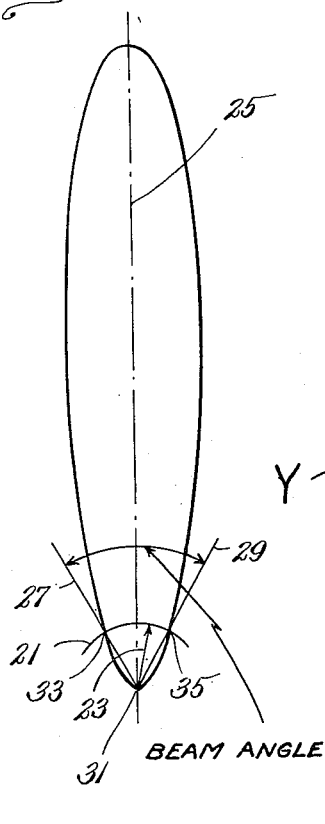
Figure 11:
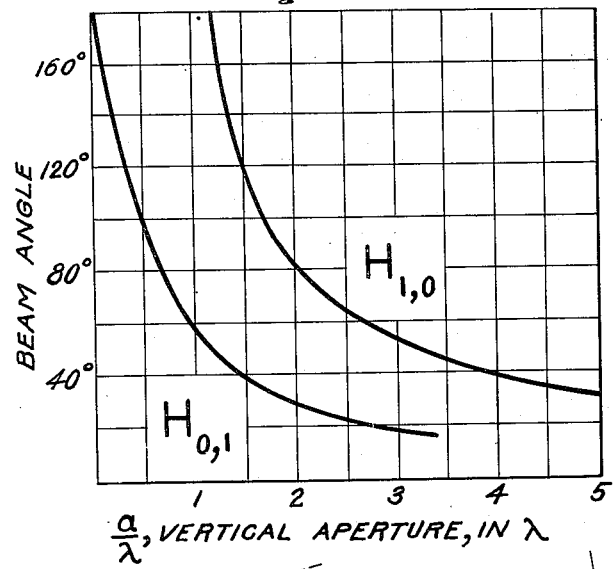
Figure 12:
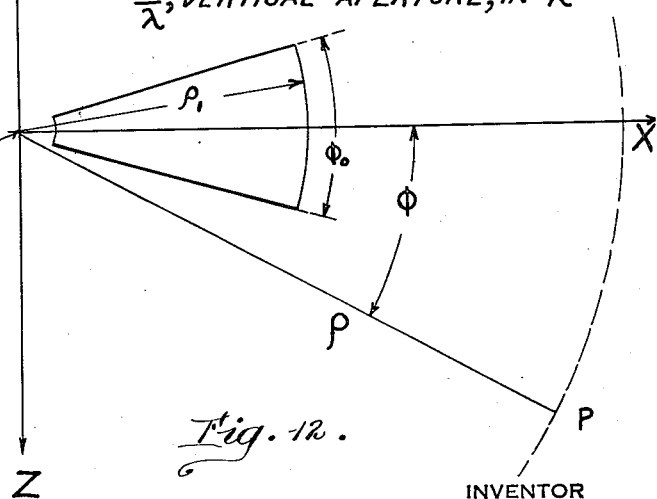
Figure 31:
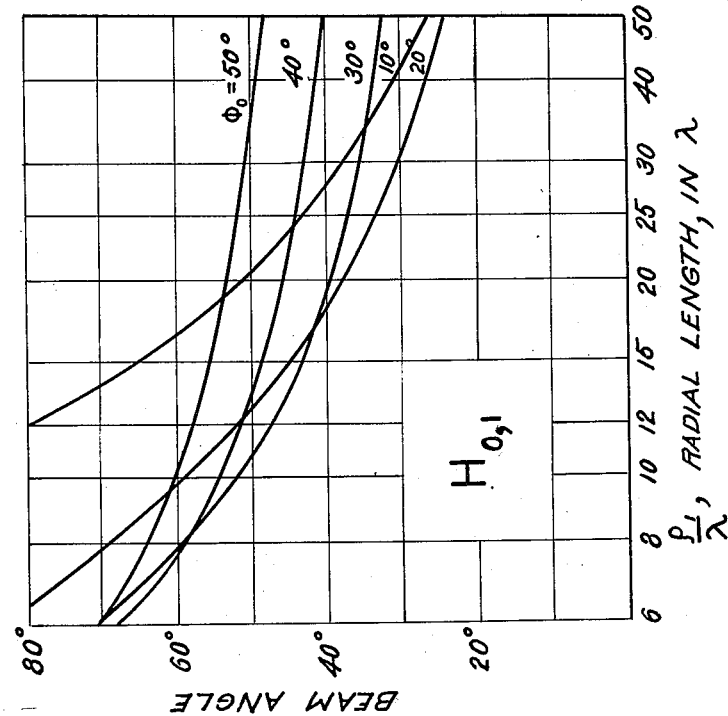
Figure 30:
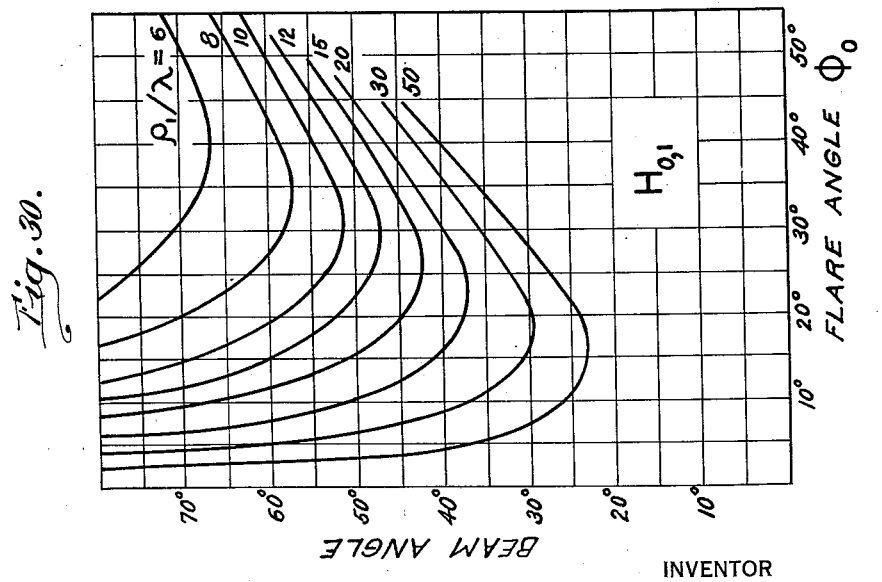
Figure 33:
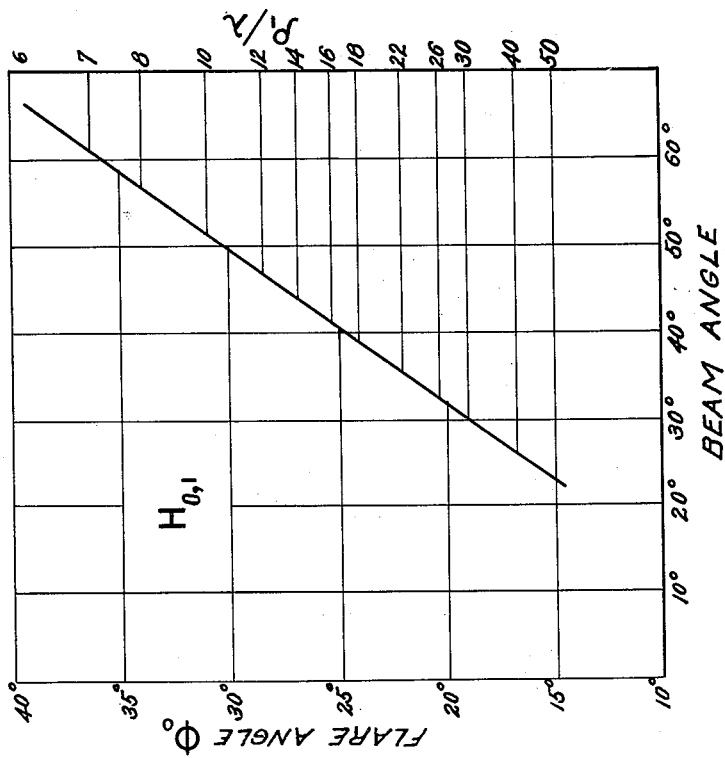
Figure 32:
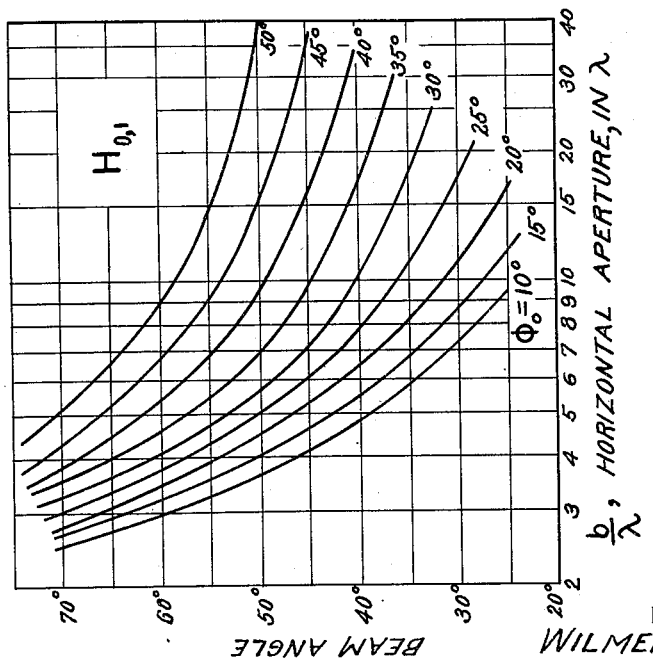
Figure 35:
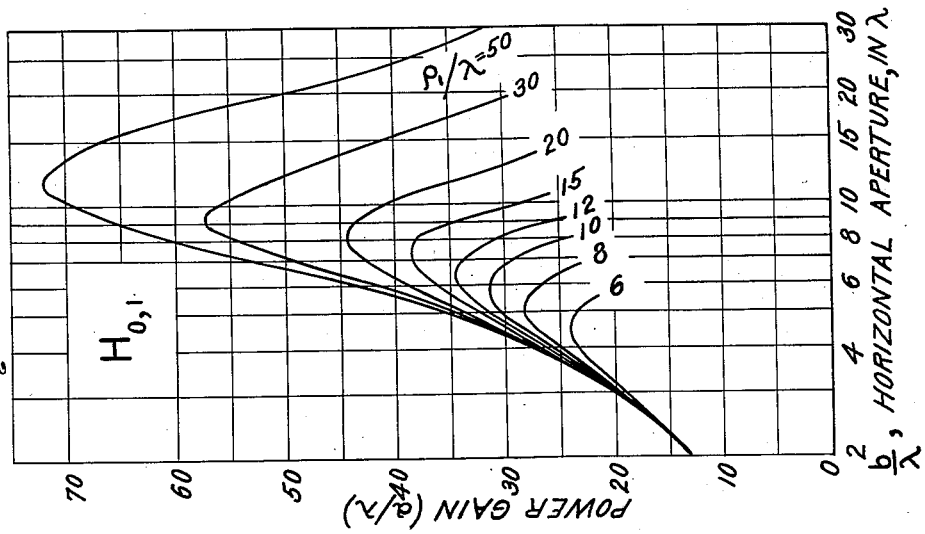
Figure 34:
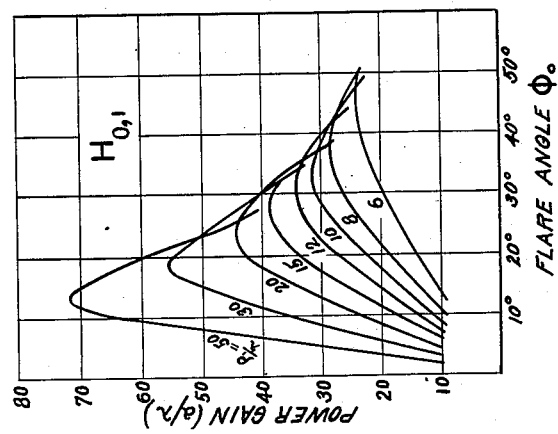
Figure 36:
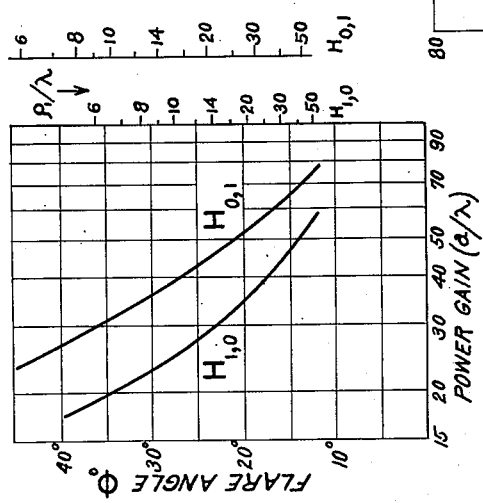
Figure 54:
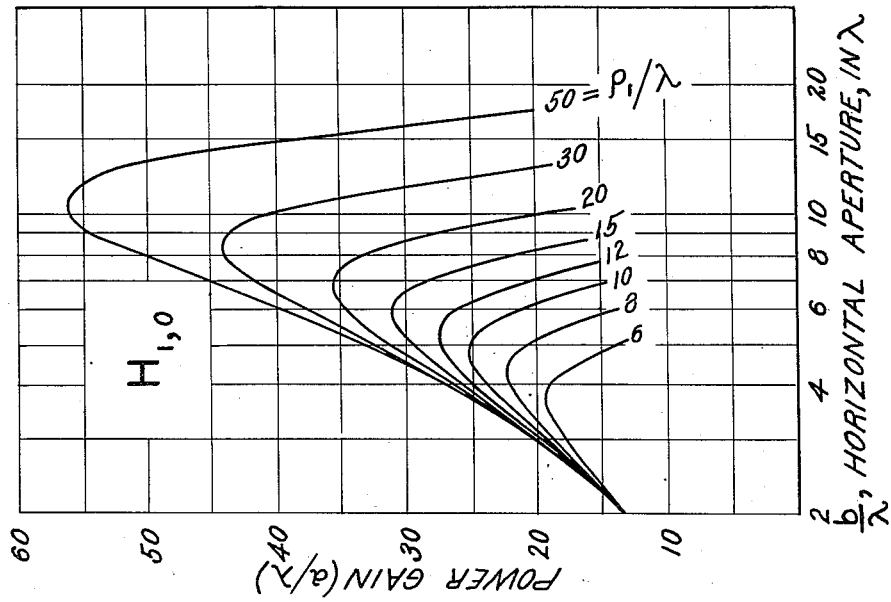
Figure 53:
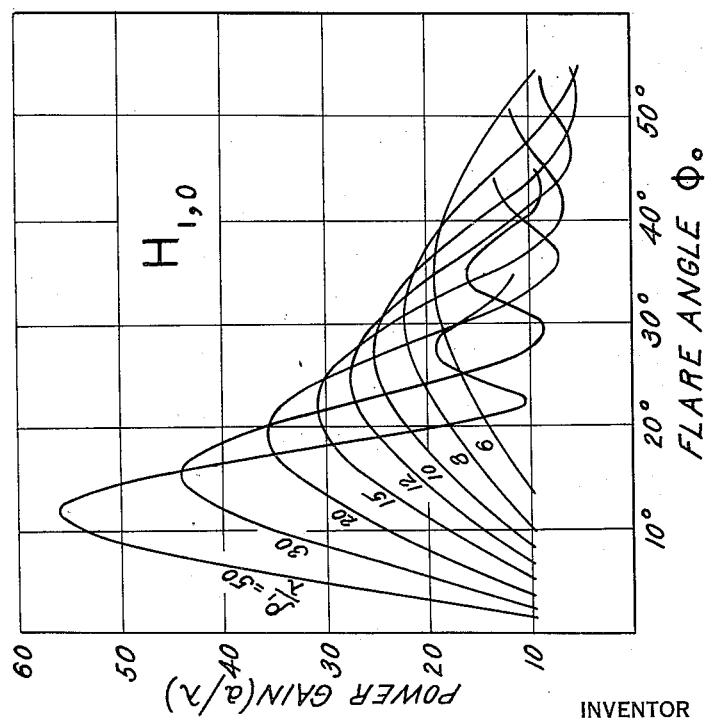
Figure 56:
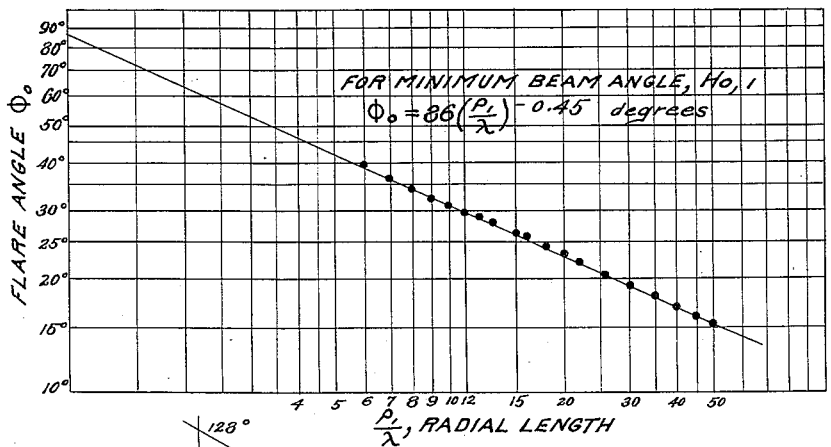
Figure 57:
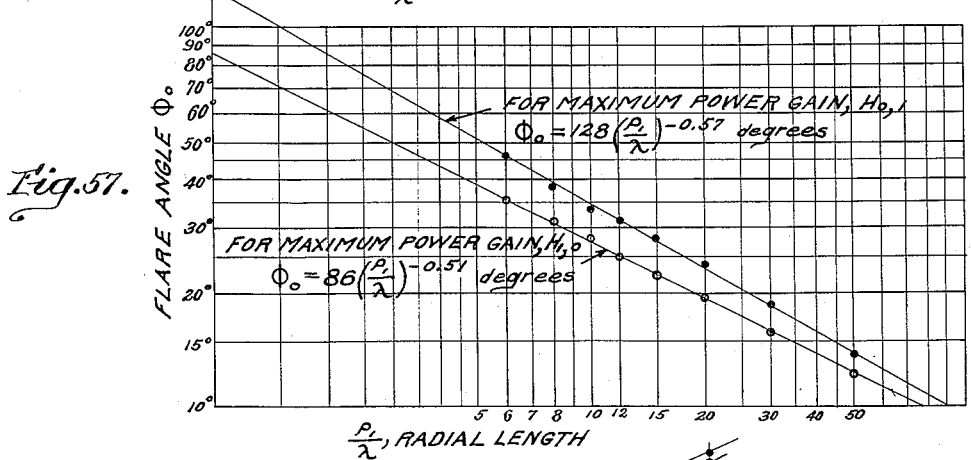

Fig. 5 is a section showing the field configuration or the $H_{0,1}$ wave, the section being in the plane passing longitudinally through the horn of Fig. 1, and containing the principal axis of the horn and the lines 5—5, which plane may, for convenience, be referred to as the longitudinal horizontal plane, parallel to the XZ plane of Fig. 4, and which section may, for convenience, be referred to as the longitudinal horizontal section;

Fig. 6 is a section showing the field configuration of the $H_{0,1}$ wave, the section being the plane at right angles to the first-named plane and passing longitudinally through the horn of Fig. 1, and containing the principal axis and the lines 6—6, which plane may, for convenience, be referred to as the longitudinal vertical plane, or the XY plane of Fig. 4, and which section may, for convenience, be referred to as the longitudinal vertical section;

Fig. 7 is a section showing the field configuration of the $H_{0,1}$ wave, the section being along the vertically disposed cylindrical surface represented by the circular arc 7—7 of Fig. 5, which cylindrical surface 7—7 may, for convenience, be referred to as a transverse cylindrical surface, parallel to the Y axis of Fig. 4, and which section may, for convenience, be referred to as a transverse vertical cylindrical section;

Fig. 8 is the same longitudinal horizontal section as Fig. 5, showing the field configuration of the $H_{1,0}$ wave;

Fig. 9 is the same transverse vertical cylindrical section as Fig. 7, represented by the circular arc 9—9 of Fig. 8, showing the field configuration of the $H_{1,0}$ wave;

Fig. 10 is the same longitudinal vertical section as Fig. 6, the field configuration of the $H_{1,0}$ wave being shown;

Fig. 11 is a plot of two curves showing the relation between beam angle and the vertical dimension of the aperture of the horn, indicated in Fig. 4 by the length $a$ in terms of the wavelength $\lambda$;

Fig. 12 is a diagram illustrating the spherical-coordinate system and design parameters used in calculating horizontal radiation patterns;

Fig. 13 is a simplified horizontal radiation pattern for the $H_{0,1}$ wave, showing also its beam angle;

Figs. 14 to 21 are similar horizontal radiation half-patterns for the $H_{0,1}$ wave, corresponding to horns all having a flare angle $\phi_0=30°$, and with their radial horn lengths $\rho_1$ equal to 6, 8, 10, 12, 15, 20, 30 and 50 wave-lengths, respectively, the remainder of each of these half-patterns (not shown) being mirror images thereof;

Figs. 22 to 29 are similar horizontal radiation half-patterns for the $H_{0,1}$ wave corresponding to horns all having a radial length $\rho_1$ equal to 12 wave-lengths, and with their flare angles $\phi_0$ equal to 15°, 20°, 25°, 30°, 35°, 40°, 45°, and 50°, respectively;

Fig. 30 is a plot of a series of curves for the $H_{0,1}$ wave, showing the relation between beam angle and flare angle $\phi_0$ for values of $$\frac{\rho_1}{\lambda}$$

equal to 6, 8, 10, 12, 15, 20, 30 and 50, respectively;

Fig. 31 is a similar plot for the $H_{0,1}$ wave, showing the relation between beam angle and $$\frac{\rho_1}{\lambda}$$

for values of the flare angle $\phi_0$ equal to 10°, 20°, 30°, 40° and 50°, respectively;

Fig. 32 is a plot similar to Fig. 31 for the $H_{0,1}$ wave, with the horizontal dimension of the mouth or aperture of the horn, indicated in Fig. 4 by the length $b$, in terms of the wave-length $\lambda$, substituted for the abscissa $$\frac{\rho_1}{\lambda}$$

and containing also additional curves corresponding to values of the flare angle $\phi_0$ equal to 15°, 25°, 35° and 45°;

Fig. 33 is an important design curve for the $H_{0,1}$ wave, representing associated values of optimum flare angle $\phi_0$ and radial horn length $$\frac{\rho_1}{\lambda}$$

plotted against beam angle;

Fig. 34 is a plot of a series of curves for the $H_{0,1}$ wave, showing the relation between power gain, in terms of $$\frac{\alpha}{\lambda}$$

and flare angle $\phi_0$, for radial lengths equal to 6, 8, 10, 12, 15, 20, 30 and 50 wave-lengths, respectively;

Fig. 35 is a similar plot for the $H_{0,1}$ wave, but with the parameter $$\frac{b}{\lambda}$$

substituted for the abscissa $\phi_0$;

Fig. 36 is a plot of two curves for the $H_{0,1}$ and $H_{1,0}$ waves, showing the relation between optimum values of the flare angle $\phi_0$ and radial horn length $$\frac{\rho_1}{\lambda}$$

for providing maximum power gain;

Figs. 37 to 44 correspond to Figs. 14 to 21, respectively, for the $H_{1,0}$ wave, but with a constant flare angle $\phi_0=35°$;

Figs. 45 to 52 similarly correspond to Figs. 22 to 29, respectively, for the $H_{1,0}$ wave, but with a constant radial length $$\frac{\rho_1}{\lambda}=15$$

and with varying flare angle $\phi_0$ for intervals of 5° between 20° and 55°;

Figs. 53 and 54 correspond to Figs. 34 and 35 for the $H_{1,0}$ wave;

Fig. 55 is a perspective of a further modified horn;

Fig. 56 represents the curve of Fig. 33, for the $H_{0,1}$ wave, but plotted directly, in logarithmic coordinates, in terms of optimum flare angle $\phi_0$ and associated radial horn length $$\frac{\rho_1}{\lambda}$$

instead of indirectly against the beam angle;

Fig. 57 similarly represents the two curves of Fig. 36, for the $H_{0,1}$ and $H_{1,0}$ waves, respectively, but plotted directly, in logarithmic coordinates, in terms of optimum flare angle $\phi_0$ and associated radial horn length $$\frac{\rho_1}{\lambda}$$

instead of indirectly against the maximum power gain; and

Figure 58:
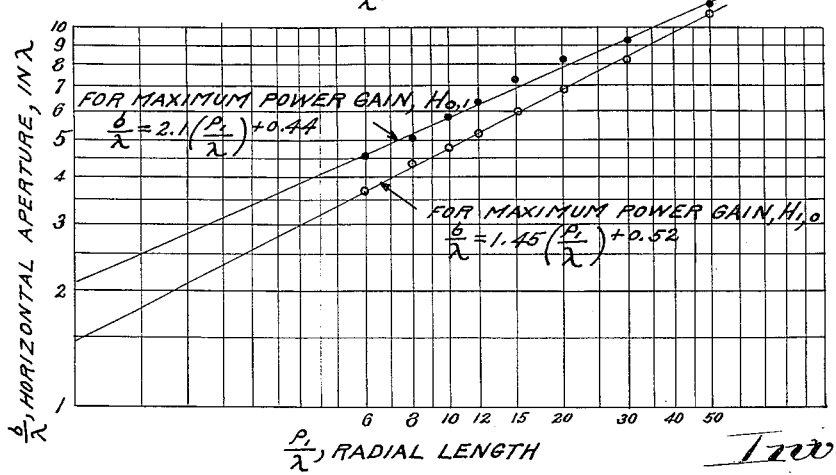

Fig. 58 is a similar logarithmic plot of two similar curves for the respective $H_{0,1}$ and $H_{1,0}$ waves, corresponding to Figs. 35 and 54, respectively, but plotted in terms of the horizontal dimension of the mouth or aperture of the horn, $$\frac{b}{\lambda}$$

against values of the radial horn length $$\frac{\rho_1}{\lambda}$$

for producing maximum power gain.

In Figs. 34, 35, 36, 53 and 54, the numerical scale of the ordinate is to be multiplied by the value of $$\frac{a}{\lambda}$$

for the horn in question to get the numerical value of the power gain.

In Figs. 1 to 4 and 55, there is illustrated a horn 16 of rectangular cross section, flaring smoothly and continuously from its throat or small or reflecting end, or the back of the horn, to a mouth or aperture or large end at its front. The principal or central axis of the horn extends between the smaller and larger ends of the horn. At its throat, it is shown connected to a hollow-pipe system comprising an elongated hollow pipe or tube body portion or section 18 that may extend over any desired distance from the horn, to the left, as viewed in Figs. 1 to 4 and 55.

The horn may be constituted of a formed sheet of conducting material, like metal, such as copper or aluminum, or it may be constituted of other material if its inner wall is otherwise rendered a conductor of the said waves. The space inside the horn, being open to the atmosphere, is naturally a non-conductor. Galvanized-iron sheeting, and thin electrolytic copper foil 21 cemented to insulating plywood 19, as illustrated in Figs. 5 to 10, have both proven satisfactory. The hollow-pipe body portion 18, to which the horn 16 is connected, may be of any desired material. If the horn 16 is of simple rectangular shape, the pipe portion 18, from which it flares out, may be likewise rectangular. Screen or other semi-open construction may also be employed.

Two of the sides may be substantially parallel, and the other two sides flared, as illustrated in Figs. 1, 3 and 55, or the horn may be pyramidal, with the sides of the horn flaring in four oppositely disposed directions, as illustrated in Fig. 2. The horns of Figs. 1, 3 and 55 may be described as of sectoral shape, and the horn of Fig. 2 may be termed pyramidal. Horns provided with straight sides in longitudinal cross-section, as illustrated in Figs. 1 and 2, are economical and easy to construct. Thorough analysis of this structure has been made and applies directly to sectoral horns and indirectly to horns of pyramidal shape.

In Figs. 3 and 55, the cross-section in the XZ plane has a hyperbolic contour, concave in one case and convex in the other. In both instances, the sides of the horn approach asymptotically to straight lines which cross to form an angle between them, which is the same as the flare angle $\phi_0$ of the horn of Fig. 1, because the waves inside these horns at a distance several wave-lengths from the throat are governed by the dimensions and flare angle $\phi_0$ of the extended portions of the sides. The sectoral horns of Figs. 3 and 55 behave, as regards their radiation properties, just as does the sectoral horn of Fig. 1. The curves of these horns, near the throat, need not be hyperbolic; substantially any curve, within wide limits, could be employed with substantially the same results.

The horn of the present invention may be used for transmission or reception of ultra-high-frequency electromagnetic waves. In transmission, electromagnetic energy, transmitted through the interior of the pipe or tube 18 from a projecting metal exciting or absorbing antenna rod or other translating apparatus 14, is delivered to the throat of the horn and propagated through the interior of the horn to the mouth as "horn waves." At the mouth, substantially all of this energy is radiated into free space as ordinary radio waves. The horn thus constitutes a directive electromagnetic radiator.

In receiving, a similar, but reverse, process takes place, the electromagnetic waves being received by the horn 16, and communicated to a receiving system (not shown).

The rod 14 is shown in Figs. 1 and 55 disposed approximately centrally in the hollow pipe 18, substantially at right angles to the axis of the horn, but it may be disposed unsymmetrically in the horn, to give a modified directive pattern for the radiant energy.

Sending apparatus (not shown) may be connected to a coaxial-line system 10, 12, or to a parallel-wire system or to any other desired connecting system. The conductor 12 may be extended into the bell of the horn or the tube 18, either parallel to the top and bottom walls as in Fig. 3, or at right angles thereto, as in Figs. 1, 2 and 55, to constitute the antenna 14.

Different types of horn waves, and combinations of the same, may be separately excited and propagated within the horn, or absorbed by the horn, by properly arranging the exciting rod or rods in or out of the throat of the horn, both as to the position of, and the current in, the rod or rods. This is described more at length in my copending application, Serial No. 249,910, filed January 9, 1939.

One of the most important modes or wave types is the lowest-order transversely polarized horn wave $H_{0,1}$, with the electric vector mainly parallel everywhere to the vertical direction, obtained with an exciting rod 14 transverse to the axis and in the vertical plane. Another important mode or wave type is the $H_{1,0}$ wave. These two wave types are probably the best for sending a single beam of radiant energy and are the waves most naturally adopted for receiving. For beam transmission, a horn of rectangular cross section perpendicular to its principal or central axis and the orientation of the exciting rod perpendicular to this horn axis, offer certain features, among them the important feature of a radiated linearly polarized space wave. The rectangular shape, furthermore, permits independent control of the width of the radiated beam in the horizontal and vertical planes.

Beams transmitted from directive antenna systems are usually accompanied by small amounts of radiation in directions other than those intended. These small amounts of radiation may be referred to as secondary lobes. Beams radiated from sectoral horns are remarkably free from secondary lobes. For this reason, the use of sectoral horns is particularly advantageous in certain kinds of applications where the shape of the beam plays an essential role in the operation. In the blind-landing of airplanes, for example, it is desirable, not only that the beam be very sharp, but also that it be peculiarly free from secondary lobes. In one such application, a smooth straight-line intersection is formed between two overlapping beams; systems of this type are commonly referred to as "equal-signal" systems. Horn radiators can provide such smooth overlapping beams without waviness or spurious components that would affect the straightness of this path of intersection. No other types of antennas have been found to produce so smooth beams with such small secondary lobes. Patterns of this character are useful also in other applications, such as direction-finding and obstacle-detection.

In Figs. 1, 3 and 55, as before described, the horn 16 is shown excited by means of a hollow-pipe transmission line 18, connected to the throat of the horn, with the translating apparatus positioned in the pipe 18, at the rear of the throat of the horn. The antenna then first excites waves in the hollow pipe, which are transmitted through the pipe 18 to the horn and thence into free space as ordinary radio waves. It is sometimes desirable, however, as explained in my application, Serial No. 240,545, filed November 15, 1938, that the translating apparatus be positioned directly in the throat of the horn, as illustrated in Fig. 2, in order directly to excite the horn itself, without the use of a hollow-pipe transmission line. It then operates efficiently to receive substantially all of the incident energy, when used as a receiver; or, when used as a transmitter, to excite waves of the horn type, and thereby to radiate a beam of character appropriate to the horn rather than to the apparatus and the antenna itself. With the apparatus in the throat, furthermore, the horn has smaller physical dimensions than when connected to the hollow pipe.

The hollow-pipe method of Figs. 1, 3 and 55 is mainly useful for wave-lengths less than about 20 centimeters, and the method of Fig. 2, involving the positioning of the antenna or other energy-translation means directly in the throat of the horn, is applicable to longer waves. Substantially the same radiation pattern may be produced with either arrangement.

The invention is not, of course, limited to the use of an exciting or absorbing rod 14. Other radiating or absorbing means, such as a vacuum tube, may also be employed, as described, for example, in my said application, Serial No. 240,545, filed November 15, 1938. As is also explained in the said application, Serial No. 240,545, optimum conditions may be obtained by adjusting a piston (not shown) at the back or throat of the horn, thus to resonate or tune the throat of the horn, thereby rendering the throat of the horn more responsive to a particular frequency or a narrow band of frequencies than to other frequencies, and also in other ways.

Symbols that will be used in this specification will be understood by reference to Fig. 4. The lower of the two parallel sides of the horn of Fig. 1 is here assumed to lie in the XZ plane, with its non-parallel or flaring sides, extended, intersecting on, and making equal angles with, the Y axis. The system may be regarded as symbolizing also cylindrical co-ordinates $y$, $\rho$ and $\phi$, as will be clear also from Fig. 12. The upper parallel side of the horn is parallel to the XZ plane, and at a distance $a$ therefrom. It is assumed that the throat of the horn is disposed along a vertical cylindrical surface having a radius $\rho_0$ and with its axis coincident with the Y axis. The non-parallel sides, each of length $\rho_1-\rho_0$, are symmetrically disposed in planes perpendicular to the XZ plane, forming with the XY plane a dihedral angle equal to $$\frac{\phi_0}{2}$$

and parallel to the lines of electric intensity of the waves propagated within the horn. The horn is regarded as having a forward direction in the positive direction of the X axis. The horizontal length of the mouth or aperture of the horn is assumed to have a value $b$. The symbols illustrated in Fig. 4 have, therefore, the following meaning:

$\phi_0$ represents the flare angle of the horn illustrated in Fig. 1;

$b$ represents the horizontal dimension of the mouth or aperture of this horn or the distance between the opposite horizontally disposed sides of the horn, at the mouth of the horn;

$a$ represents the corresponding vertical dimension, at right angles to the horizontal dimension or the distance between the opposite vertically disposed sides of the horn, at the mouth of the horn;

$\rho_1$ represents the radial length of the horn, measured along one of the flaring sides, from the point or apex of the horn to the mouth or aperture; and $\rho_0$ represents the cut-off length, from the said apex to the free end of the throat of the horn.

These symbols will have approximately the same or corresponding meaning in the case of pyramidal horns two of the opposite sides of which may be more or less parallel. It is convenient to measure the lengths $a$, $b$, $\rho_0$ and $\rho_1$ in terms of the wave-length $\lambda$; they may, therefore, if the same unit of length be used for all dimensions and for the wave-length $\lambda$, be represented by the symbols $$\frac{a}{\lambda}, \frac{b}{\lambda}, \frac{\rho_0}{\lambda} \text{ and } \frac{\rho_1}{\lambda}$$

The space wave radiated by the horn in beams of different configurations, and the response of a receiving horn to waves arriving at different space angles, depends on the shape of the horn in all cross sections, and the configuration of the exciting system at the throat, or of the wave delivered thereby the hollow-pipe transmission line. It depends also on the flare angle $\phi_0$ and the cut-off length $$\frac{\rho_0}{\lambda}$$

Expressions for the field configurations and transmission properties of these waves may be obtained by solving Maxwell's equations in cylindrical co-ordinates and satisfying the boundary conditions on the surface of the horn. The cylindrical co-ordinates $\rho$ and $\phi$ are shown in Fig. 12, in the XZ plane of Fig. 4.

In general, there are two distinct groups of waves: E-waves, having a radial component of electric intensity, but no radial component of magnetic intensity, in the horn; and H-waves, having a radial component of magnetic intensity, but no radial component of electric intensity, in the horn. Two subscripts are needed to define the waves of different orders. The subscripts $n$ and $m$ are used, each representing a positive integer denoting the number of half-sinusoidal variations in the field between the top and bottom and the two side walls, respectively. Thus, we have the $H_{n,m}$ and the $E_{n,m}$ types of waves.

For most applications of the horn, the H-waves are employed, particularly the two waves of lowest order, $H_{0,1}$ and $H_{1,0}$. The reason for this choice is that the configuration of the field of these waves inside the horn is such as to produce substantially single-lobe beams of linear polarization in the radiated waves. Both waves have constant phase on cylindrical surfaces about the axis within the horn.

Special cases may arise wherein several wave types may be used simultaneously. It will be assumed, however, that the throat or the exciting means 14, or both, have been so constructed, as described, for example, in my copending application, Serial No. 249,910, filed January 9, 1939, that either an $H_{0,1}$ or $H_{1,0}$ wave alone shall exist in the horn, when used for transmitting; or so that the horn shall be responsive to the desired $H_{0,1}$ or $H_{1,0}$ wave alone, when used for receiving.

The $H_{0,1}$ wave may be excited by the current-carrying antenna rod 14 in the throat disposed parallel to the Y axis of Fig. 4, as shown in Fig. 2, or by feeding an $H_{0,1}$ wave into the throat from the rectangular hollow pipe 18, as shown in Figs. 1, 3 and 55.

As appears from Figs. 5 to 7, the electric field intensity E in the $H_{0,1}$ wave, represented by the black dots in Fig. 5, is everywhere parallel to the Y axis, at right angles to the direction of propagation. It is of uniform intensity in the direction of the Y axis, but it has a half-sinusoidal distribution in intensity along arcs concentric with the Y axis, such as the arc 7—7 of Fig. 5, between the two flared sides, at right angles to the direction of propagation. The magnetic lines lie in planes perpendicular to the Y axis, or parallel to the XZ axis.

The $H_{1,0}$ type of wave may be excited by the current-carrying rod 14 disposed centrally in the throat parallel to the XZ plane, as illustrated in Fig. 3, or by feeding an $H_{1,0}$ wave into the throat from a rectangular hollow pipe.

In the $H_{1,0}$ wave, as illustrated in Figs. 8 to 10, the electric lines of force lie along arcs concentric with the Y axis between the two flared sides; they have a uniform distribution along the arcs, but a half-sinusoidal distribution in the direction of the Y axis. The magnetic lines lie in planes passing through the Y axis.

These waves will not be more fully described herein because they will be understood without further description by reference to a paper by L. J. Chu and W. L. Barrow, entitled "Electromagnetic Waves in Hollow Metal Tubes of Rectangular Cross Section," Proceedings of the Institute of Radio Engineers, vol. 26, No. 12, December, 1938, commencing at page 1520, and also to a paper by Barrow, entitled, "Electromagnetic-Horn Radiators," Union Radio Scientifique Internationale, No. 79, p. 277, containing a revision of a paper presented at the Joint Meeting of the said Union and the Institute of Radio Engineers, at Washington, D. C., April 30, 1938. See also a paper by W. L. Barrow and L. J. Chu, entitled, "Theory of the Electromagnetic Horn," Proceedings of the Institute of Radio Engineers, vol. 27, No. 1, January, 1939, commencing at page 51, and also a paper by W. L. Barrow and F. D. Lewis, entitled, "The Sectoral Electromagnetic Horn," Proceedings of the Institute of Radio Engineers, vol. 27, No. 1, January, 1939, commencing at page 41.

The dotted lines represent magnetic field intensities and the solid lines electric field intensities. The crowding of the magnetic lines near the throat of the horn indicates relatively large intensities. The wave-length in the horn decreases gradualy as the wave travels outward toward the mouth or aperture of the horn. The waves undergo high attenuation and have a very small signal or group velocity in the throat of the horn. As they progress toward the mouth of the horn, their attenuation becomes less and the signal velocity increases. Near the horn mouth, the attenuation of the wave is that of a spherical wave, and the velocity of the wave is that of light.

When the substantially transverse cylindrical horn waves reach the mouth of the horn, they become free from the guiding surfaces of the horn and spread out into free space as radiant energy along sperical surfaces, one of which, considered to be at a remote distance compared to wave-length $\lambda$ and the aperture of the horn, is indicated by a dashed line P in Fig. 12. Because there is no apreciable longitudinal field, these waves form a beam of transverse electromagnetic waves in space, and because of the limited dimensions of the mouth or aperture of the horn, this beam has a definite angular spread. The horn thus guides the electromagnetic energy from the throat outward in such a way that a substantially transverse wave is produced over the bounded, but relatively large, mouth or aperture of the horn. These radiation patterns, which are single-valued, show that the horn is unusually free of secondary lobes and stray radiation, and will operate well over a broad band width.

If the electric-field intensity E be plotted in polar co-ordinates, against the space angle, $\Phi$, a radiation pattern will be produced in a plane substantially at right angles to the lines of electric intensity of the waves within the horn, in which radiation pattern the value of the amplitude of the electric-field intensity E for any given $\Phi$ will be represented by the length $\rho'$. This will supply the radiation characteristic or pattern of the horn.

The plane radiation pattern along the intersection of this sphere and the XY plane will be referred to as the vertical pattern, and the corresponding pattern along the intersection of this sphere and the XZ plane will be referred to as the horizontal pattern.

Let it be assumed that a receiving instrument is situated at the point P at a great distance from the horn, a distance so great, compared to the wave-length $\lambda$ and the transverse dimension $a$ of the mouth of the horn, that the horn acts substantially like a point source. In polar co-ordinates, the point P is at a distance $\rho$ from the Y axis, and makes an angle $\Phi$ with the X axis. Let it be further assumed that the point P is moved along the dashed circular arc, at a constant distance $\rho$, but at different angles $\Phi$. At these different points P, of course, different electric intensities E will be observed in the instrument. A curve is then plotted in polar co-ordinates, establishing the relation between the angle $\Phi$ and $\rho'$ the electric intensity E at the various points P. Such a curve is represented in Fig. 13. $\Phi=0$ represents the horizontal line or the X axis, corresponding to the maximum electrical intensity E, when the point P is on the X axis, and any particular radius $\rho'$ represents the electric intensity E at the point P for the corresponding angle $\Phi$. A simplified horizontal pattern for the $H_{0,1}$ wave is illustrated in Fig. 13. Its forward axis 25 corresponds to the X axis of Fig. 12.

The shape of the radiation pattern depends on both the size or dimensions of the horn and its general shape. If the dimensions are altered, the radiation pattern will also be changed, and different sizes of horn produce beams of varying degrees of sharpness. Experiments have been made with horns of the type illustrated in Fig. 1, the angle between the two pairs of opposite sides of which could be varied independently, and the length $\rho_1$ of which sides could also be varied, and the experiments were also supported by theory. As a result of these experiments and theory, it developed that, in evaluating the effectiveness of a given horn to produce a directed beam of radiation, it is desirable to bear in mind three factors.

The first is the detailed shape of the radiation pattern, such as the presence and relative amplitudes of secondary lobes. The simplified pattern of Fig. 13 is shown without any secondary lobes.

The second is the angular width of the beam, or the "beam angle," indicated as such in Fig. 13. The beam angle may be defined as follows: Let an arc 21 be described, with radius 23 equal to an arbitrary one-tenth the length of the forward axis 25 of the radiation pattern, representing one-tenth of the field intensity. Let radial straight lines 27 and 29 be drawn between the origin 31 of the radiation pattern and the points 33 and 35 of intersection between the radiating pattern and the arc 21. The angle between the lines 27 and 29 is the beam angle. It is obviously twice the angle between the forward axis 25, correspondingly to $\phi=0$, and either of the lines 27 and 29, corresponding to a value of $\phi$ which may be represented by $\phi'$. The angle $\phi'$, then, which is half the beam angle, is associated with that value of the radius $\rho'$ that is equal to one-tenth of the maximum value of E, corresponding to $\phi=0$. The beam angle is a measure of the sharpness of the angle of the radiated waves. A small beam angle indicates that the horn is sharply directive. The smallest beam angle represents the optimum condition.

The third factor is the relative power gain. Assuming that a dipole were replaced for the horn, the relative power is defined as the ratio of the power that would be radiated from the dipole to that radiated from the horn to produce, in each case, the same magnitude of electric-field intensity at a fixed remote point on the X axis.

In the design of electromagnetic-horn radiators (and similar considerations apply for receivers), therefore, two aspects of the horn are of fundamental importance. The first of these has to do with the excitation within the horn, as by an appropriate disposition of the exciting rod or rods 14, of the desired type of wave to the exclusion of waves of other types. Reference may be made, once more, to my copending application, Serial No. 249,910, where the criterion is laid down that it is necessary to make the size of the throat and the radial length $\rho_1$ of the horn of such values that the desired wave only shall be produced for radiation at the mouth or aperture of the horn. The second important aspect of design concerns the radiation into space of a beam that meets the given requirements as to smoothness, sharpness and concentration of the radiant energy in one direction. To attain this end, it is necessary that two of the dimensions of the horn, in the plane in which these requirements are given, as, for example, the flare angle $\phi_0$, and the radial length $\rho_1$, or the flare angle $\phi_0$ and the horizontal-aperture dimension $b$, have definite values. By appropriate dimensioning, the beam may be made fan-shaped or cigar-shaped or of any other desired shape.

It was found that, for a given horn length $\rho_1$, there is a particular flare angle $\phi_0$ that yields the sharpest beam angle; it may be referred to as the optimum flare angle $\phi_0$ for a horn of that particular length $\rho_1$. Assuming a constant flare angle $\phi_0$, on the other hand, one may find the best length $\rho_1$ of the horn for yielding the sharpest angle. It is possible, therefore, to produce beams the sharpness of which, in two mutually perpendicular planes, shall have any desired value. The exact relationships involved may, in any case, be determined from experiments made by varying the dimensions of the horn, or they may be determined theoretically and lead to engineering design data on which the most economical-size horn may be determined and, in general, to definite information that allows the dimensions of horns for particular applications to be predetermined.

In Fig. 11, the relation is shown between the beam angle in the XY plane and the vertical height of the aperture $a$, for the two waves $H_{1,0}$ and $H_{0,1}$. No optimum is found in either of these curves.

The radiation patterns were computed by means of Huygens principle from the distribution of the Hertzian vector at the mouth of the horn, more or less as described in a paper by W. L. Barrow and F. M. Greene, entitled, "Rectangular Hollow-Pipe Radiators," Proceedings of the Institute of Radio Engineers, vol. 26, No. 12, December, 1938, commencing at p. 1498. The method, exactly as employed, was an application of a further development of the Huygen's method, described in a paper by J. A. Stratton and L. J. Chu, Physical Review, vol. 56, pages 99 to 107, July, 1939. This distribution was assumed to be the same as that which would exist at the mouth if the horn were infinitely long.

Experiments have justified this assumption for most practical cases. The radiation patterns were plotted both in rectangular and polar co-ordinates, and the beam angle was measured from the rectangular plots. The power radiated by the horn was obtained by integrating the Poynting vector over the mouth of the horn with the field at the mouth adjusted to give unity power density at a fixed distance and on the X axis from the origin, and was compared with the power radiated by a dipole to produce the same effect as before defined. Although the power gain obtained in this way does not include copper losses in either horn or dipole, it is believed sufficiently accurate for most purposes, as described in the said paper by W. L. Barrow and L. J. Chu, entitled, "Theory of the Electromagnetic Horn."

Over a hundred radiation patterns or composite curves of beam angle, power gain, etc., were calculated for a wide range of horn parameters, plotted and analyzed. The horizontal radiation patterns shown in Figs. 14 to 29 show the general shapes and trends of all these curves. A number of similar curves have been produced experimentally, as shown in the said paper by W. L. Barrow and F. L. Lewis, entitled, "The Sectoral Electromagnetic Horn," and also in the said paper by W. L. Barrow, entitled, "Electromagnetic-Horn Radiators."

The vertical patterns, in the XY planes, as appears from the said Barrow and Greene paper, have the same shapes as those of a rectangular hollow-pipe radiator. This is because the distributions of the horn waves in the direction of the Y axis are similar to the distributions of the corresponding hollow-pipe waves in this direction. These patterns have a principal lobe centered on the X axis and secondary lobes of relatively small amplitude. The sharpness of the principal lobe depends mainly on the vertical dimension $$\frac{a}{\lambda}$$

of the horn mouth or aperture, or the dimension parallel to the lines of electric intensity of the waves propagated within the horn. The relation between them is illustrated by the curves of Fig. 11.

In these horizontal radiation patterns, in the XZ plane, for the $H_{0,1}$ wave, letting $|E|$ represent the absolute value of the radius vector, from the origin $31$, of the polar co-ordinate plot, and $\phi$ the angle made by this radius vector with the forward axis $25$ of the radiation pattern, it can be shown that the radiation patterns are given by the following relation:

$$\left|E\right| = \left|B \frac{3}{16\sqrt{10}} \frac{a}{\rho} (1 + \cos \phi)\right.$$

$$\left[ e^{i\pi\frac{\phi}{\phi_0}} \int_{u_1}^{u_2} \tfrac{1}{2}\{J_{-\frac{1}{2}}(u) - iJ_{\frac{1}{2}}(u)\} du + \right.$$

$$\left.\left. e^{-i\pi\frac{\phi}{\phi_0}} \int_{u_3}^{u_4} \tfrac{1}{2}\{J_{-\frac{1}{2}}(u) - iJ_{\frac{1}{2}}(u)\} du \right]\right| \quad (1)$$

where $$u_1 = \frac{80}{9\pi} \frac{\rho_1}{\lambda} \left[ -\frac{\phi_0}{2} - \phi - \frac{9\pi^2}{160\phi_0} \frac{\lambda}{\rho_1} \right]^2$$

$$u_2 = \frac{80}{9\pi} \frac{\rho_1}{\lambda} \left[ +\frac{\phi_0}{2} - \phi - \frac{9\pi^2}{160\phi_0} \frac{\lambda}{\rho_1} \right]^2$$

$$u_3 = \frac{80}{9\pi} \frac{\rho_1}{\lambda} \left[ -\frac{\phi_0}{2} - \phi + \frac{9\pi^2}{160\phi_0} \frac{\lambda}{\rho_1} \right]^2$$

$$u_4 = \frac{80}{9\pi} \frac{\rho_1}{\lambda} \left[ +\frac{\phi_0}{2} - \phi + \frac{9\pi^2}{160\phi_0} \frac{\lambda}{\rho_1} \right]^2$$

$B$ is a constant determining the absolute strength of the radiation,
$e$ is the base of the Naperian logarithms,
$i = \sqrt{-1}$,
$\pi$ is the ratio of the circumference to the diameter of a circle, and
$J_{-\frac{1}{2}}(u)$ and $J_{\frac{1}{2}}(u)$ denote the Bessel functions of the first kind, of order $-\frac{1}{2}$ and $+\frac{1}{2}$, respectively, and of argument $u$.

The vertical bars denote that the absolute magnitude is to be taken.

Equation 1 is a function of the variables $\rho_1$, $\phi_0$ and $a$, which determine the dimensions of the horn, the wave-length $\lambda$, the angle $\phi$ made by the radius vector $|E|$ in the said patterns, and the large distance $\rho$, at which the field is observed. Theoretically, the equation may be solved for $\phi$ in terms of these other variables. Let that solution be expressed as follows:

$$\phi = f_1(|E|, \phi_0, a, \lambda, \rho)$$

In any particular case, $\rho$ is fixed; $\lambda$ may be assumed given for some particular problem, with a particular horn having a length $\rho_1$ and a vertical height $a$. The expression for $\phi$ then becomes $$\phi = f_2(|E|, \phi_0)$$

The maximum value of $|E|$, corresponding to $\phi=0$, which may be represented by $|E(0)|$, is readily obtained by substitution, as follows:

$$|E(0)| = \left|B\frac{3}{16\sqrt{10}} \frac{a}{\rho} 2\left[\int_{u_1'}^{u_2'} \tfrac{1}{2}\{J_{-\frac{1}{2}}(u) - iJ_{\frac{1}{2}}(u)\}du + \int_{u_3'}^{u_4'} \tfrac{1}{2}\{J_{-\frac{1}{2}}(u) - iJ_{\frac{1}{2}}(u)\}du\right]\right|$$

where $$u_1' = \frac{80}{9\pi}\frac{\rho_1}{\lambda}\left[-\frac{\phi_0}{2} - \frac{9\pi^2}{160\phi_0}\frac{\lambda}{\rho_1}\right]^2$$

$$u_2' = \frac{80}{9\pi}\frac{\rho_1}{\lambda}\left[+\frac{\phi_0}{2} - \frac{9\pi^2}{160\phi_0}\frac{\lambda}{\rho_1}\right]^2$$

$$u_3' = \frac{80}{9\pi}\frac{\rho_1}{\lambda}\left[-\frac{\phi_0}{2} + \frac{9\pi^2}{160\phi_0}\frac{\lambda}{\rho_1}\right]^2$$

$$u_4' = \frac{80}{9\pi}\frac{\rho_1}{\lambda}\left[+\frac{\phi_0}{2} + \frac{9\pi^2}{160\phi_0}\frac{\lambda}{\rho_1}\right]^2$$

If, now, in this expression, it be assumed that $$|E| = 0.1|E(0)|$$

then $$\phi' = f_3(\phi_0)$$

will represent half the beam angle, as before defined. Corresponding to different flare angles, therefore, there will be different beam angles, and it may be shown that this function has a minimum for a particular value of $\phi_0$, determined by the equation $$\frac{d\phi'}{d\phi_0} = 0$$

Equation 1 will hold good for this value $\phi'$ as well as for other values of $\phi$, when $\phi'$ is substituted for $\phi$ therein.

Similarly, the equation $$\frac{d\phi'}{d\rho_1} = 0$$

will determine the horn length $\rho_1$ corresponding to the minimum beam angle. As will appear hereinafter, to satisfy this equation strictly, $$\rho_1 = \infty$$

but, as will also appear hereinafter, very little improvement is obtained beyond a certain horn length $\rho_1$. As a practical matter, therefore, the shortest such length $\rho_1$ may be adopted in practice. For practical purposes, therefore, the last-written equation may be considered to be substantially satisfied when $\rho_1$ has any value equal to or in excess of the value before-mentioned.

Similarly, also, the equation $$\frac{d\phi'}{d\lambda} = 0$$

represents the wave-length employed with any particular horn of length $\rho_1$ and flare angle $\phi_0$ for yielding a minimum beam angle. Similarly, $$\frac{d\phi'}{d\frac{\rho_1}{\lambda}} = 0$$

corresponds to the minimum beam angle for a given ratio of horn length to wave length. Finally, $$\frac{d\phi'}{db} = 0$$

will yield the minimum beam angle corresponding to a horizontal horn dimension $b$, or the dimension in a plane at right angles to the lines of electric intensity of the waves that are propagated within the horn. In view of the fact that, given the flare angle $\phi_0$, the horn is determined by either the radial length $\rho_1$ or the horizontal dimension $b$, through the relation $$\frac{b}{2} = \rho_1 \sin\frac{\phi_0}{2}$$

the expressions $$\frac{d\phi'}{db}$$

and $$\frac{d\phi'}{d\rho_1}$$

are not independent.

It will be understood that it is not essential that the minimum beam angle be obtained analytically in this manner. It may be obtained graphically. For example, in Fig. 30, there are shown a number of curves showing the relation, for different values of $$\frac{\rho_1}{\lambda}$$

between the beam angle and the flare angle $\phi_0$. In these curves, the expression before given, $$\frac{d\phi'}{d\phi_0} = 0$$

is represented by the minima of these curves. The minima of the curves in Fig. 31 would similarly be represented by $$\frac{d\phi'}{d\frac{\rho_1}{\lambda}}$$

As before stated, these curves do not, strictly, have any minimum, but it is apparent that these curves approach a limiting value as $$\frac{\rho_1}{\lambda}$$

is increased and that there is no advantage in making $$\frac{\rho_1}{\lambda}$$

greater than a fixed value.

The horizontal radiation patterns of Figs. 14 to 29 are not complete, even as half-patterns, because the mathematical analysis breaks down when $\phi$ exceeds a certain value. The experimental curves before mentioned, however, demonstrate that, in practice, the radiation patterns extend through the complete 360 degrees. Though the radiation patterns show slight irregularities, secondary lobes, however, are substantially absent from all of them. This fact, of considerable significance for some applications, is attributable to the half-sinusoidal distribution of electric intensity at the mouth of the horn.

Figs. 14 to 21 show how the beam-angle varies with variable radial length $$\frac{\rho_1}{\lambda}$$

and a fixed flare angle $\phi_0 = 30°$. When $$\frac{\rho_1}{\lambda} = 8$$

the curve is sharper than when $$\frac{\rho_1}{\lambda} = 6$$

$$\frac{\rho_1}{\lambda} = 10$$

yields a sharper curve still, and the same is true with the higher values of $$\frac{\rho_1}{\lambda}$$

Beginning with about $$\frac{\rho_1}{\lambda} = 12 \text{ or } 15$$

the larger values of $$\frac{\rho_1}{\lambda}$$

do not increase the sharpness of the curve. For practical purposes, therefore, for a flare angle $\phi_0=30°$, one need not adopt a value of $$\frac{\rho_1}{\lambda}$$

greater than 12 or 15, for substantially as sharp a beam will be obtained with this value of $$\frac{\rho_1}{\lambda}$$

as with any larger value.

Figs. 22 to 29 show how the beam-angle varies with fixed radial length $$\frac{\rho_1}{\lambda} = 12$$

and a variable flare angle $\phi_0$. The flare angle $\phi_0=20°$ yields a sharper beam angle than a flare angle $\phi_0=15°$. The beam angle corresponding to a flare angle $\phi_0=25°$ is sharper still, and a flare angle $\phi_0=30°$ yields a beam angle that is perhaps a little sharper than for $\phi_0=25°$. From there on, however, increasing the flare angles gives a less sharp beam angles.

Sharpness of the beam thus reaches a maximum with a flare angle $\phi_0$ of 30° when $$\frac{\rho_1}{\lambda} = 12 \text{ or } 15$$

When $$\frac{\rho_1}{\lambda}$$

is held fixed, on the other hand, an increase in the flare angle $\phi_0$ will yield, first, a decreasing beam angle and, later, an increasing beam angle. In the particular value of $$\frac{\rho_1}{\lambda} = 12$$

the optimum condition was obtained around $\phi_0=30°$.

This can be checked by referring to Fig. 30, showing a series of curves, for different values of $$\frac{\rho_1}{\lambda}$$

giving the relation between the beam angle and the flare angle $\phi_0$. When $$\frac{\rho_1}{\lambda} = 12$$

the minimum beam angle is obtained for a flare angle $\phi_0=30°$.

The following conclusions are immediately evident from Figs. 14 to 29 and also Figs. 30 to 32:

First, for constant flare angle $\phi_0$, the sharpness of the beam is improved by increasing the horn length $\rho_1$ of the horn, up to a certain length, beyond which very little improvement occurs; and Secondly, for constant horn length $\rho_1$, there is an optimum value of flare angle $\phi_0$ that will produce the sharpest or maximum beam angle. The beam angle decreases at first, and then increases; for very long horns, the beam angle approaches the flare angle $\phi_0$.

The optimum flare angle $\phi_0$ and the corresponding beam angle both decrease with an increase in horn length $\rho_1$. For a fixed horn mouth or aperture, the beam angle decreases with decreasing flare angle and is a minimum when the flare angle is zero, that is, when the horn degenerates into a hollow pipe.

If the flare angle $\phi_0$ is small, the beam angle of the radiation pattern is controlled essentially by the horn length $\rho_1$ or the horizontal dimension $b$ of the horn mouth or aperture. Larger such apertures, for example, produce sharper beams.

If the flare angle $\phi_0$ is large, on the other hand, the beam angle is controlled essentially by the direction of propagation in the horn, that is, by the angle of flare. The smaller the flare angle, the less divergent will be the directions of propagation in the horn, and the sharper, therefore, will be the radiated beam.

The horn length $\rho_1$ and the flare angle $\phi_0$ have opposite effects. If the flare angle $\phi_0$ is neither too large nor too small, the opposite effects of the two factors will compensate each for the other to produce a beam of sharpest angle.

Each curve in Fig. 30 has a minimum, with the minima lying along an approximately straight line (not shown) through the origin, which line defines the shortest horns that may be employed to produce a beam of a specified angle. The right-hand portions of these curves approach an asymptote at an angle of 45° to the horizontal, passing through the origin. The asymptote corresponds to a horn of minimum length, having a beam angle equal to the flare angle $\phi_0$; the asymptote, if drawn in, would pass through the intersection of the lines representing 30° beam angle and 30° flare angle, at a 45° angle to the horizontal.

The same data is represented in Fig. 31, but with the flare-angle abscissa replaced by $$\frac{\rho_1}{\lambda}$$

The curves, therefore, represent the relation between the beam angle and $$\frac{\rho_1}{\lambda}$$

for different fixed values of flare angle $\phi_0$. These curves have an envelope (not shown). The envelope corresponds to the shortest horn that will provide a given beam angle. For example, a beam angle of 50° might be provided by a horn about 11 wave-lengths in length, which value is taken from the envelope. It is also possible to produce a beam angle of 50° by a longer horn, for example, by a horn of length equal to 20 wave-lengths, having a flare angle $\phi_0=10°$. It is not possible, however, to produce this beam angle of 50° by any horn shorter than that given by the envelope.

Fig. 32 represents the same data as Fig. 31, except that the abscissa is here $$\frac{b}{\lambda}$$

The curves indicate the relation, therefore, between the beam angle and the length $$\frac{b}{\lambda}$$

for different values of flare angle $\phi_0$. If extended far enough, these curves would all approach asymptotes parallel to the beam-angle ordinate.

With the aid of Figs. 30, 31 and 32, giving the relations between the various parameters, it becomes possible to design a horn that, for example, shall have the sharpest beam for particular conditions. As an illustration, let it be assumed that it is desired to design a horn as a radiator in a blind-landing system. Such a horn should be disposed as near to the ground as possible, not only because of economy, but also, and more important, because, if too high up, the horn may be struck by a landing plane. Not more than a given relatively small space can, therefore, be assigned on the landing field in which to install the horn. The height of that space would determine the $b$ dimension of the horn.

Being given this height $b$, one could now, from Fig. 32, find the relation between beam angle and flare angle $\phi_0$. If, for example, the desired beam angle is 30°, and $b=10\lambda$, Fig. 32 gives the information that the necessary flare angle would be about 18°. No shorter horn than the one so determined from the curves can provide the desired beam angle.

It is thus possible, with the aid of these curves, to establish relations between these variables to yield the best conditions.

Fig. 33 is a composite curve showing the optimum flare angle $\phi_0$ and the associated length $$\frac{\rho_1}{\lambda}$$

to produce a given beam angle. The curve of Fig. 33 is obtained by plotting the minimum points of the family of curves shown in Fig. 30. The optimum conditions represented in Fig. 33 permit the ready specification of optimum horn dimensions for a beam of given angle. If a beam angle of a given value is desired, the projection to the right of the curve shows the shortest length $$\frac{\rho_1}{\lambda}$$

that can produce the desired beam angle, and the projection to the left of the figure gives the associated value of flare angle $\phi_0$. To illustrate, if the desired beam angle is 30°, the optimum horn design would require a horn length $\rho_1$ of about 30 wave-lengths, and a flare angle $\phi_0$ of about 18°.

Insofar as the left side of Fig. 33 is concerned, the curve is a straight line, just as is the line connecting the minimum points in Fig. 30. The linear relation feature does not exist, however, at the right-hand side of Fig. 33; a different non-uniform scale has there been adopted for $$\frac{\rho_1}{\lambda}$$

Fig. 34 has a relation similar to Fig. 30, but plotted in terms of the power gain instead of beam angle.

The power gain for the $H_{0,1}$ wave is given by the expression $$P_{0,1}=\frac{3\pi^2}{160\phi_0}\frac{a}{\lambda}\left|2\int_{v_1}^{v_2}\{J_{-\frac{1}{4}}(v)-iJ_{\frac{1}{4}}(v)\}dv\right|^2 \quad (2)$$

where $$v_1=\frac{80}{9\pi}\frac{\rho_1}{\lambda}\left[-\frac{\phi_0}{2}-\frac{9\pi^2}{160\phi_0}\frac{\lambda}{\rho_1}\right]^2$$

and $$v_2=\frac{80}{9\pi}\frac{\rho_1}{\lambda}\left[\frac{\phi_0}{2}-\frac{9\pi^2}{160\phi_0}\frac{\lambda}{\rho_1}\right]^2$$

and for the $H_{1,0}$ wave by the expression $$P_{1,0}=\frac{3\pi}{40\phi_0}\frac{a}{\lambda}\left|2\int_{v_3}^{v_4}\{J_{-\frac{1}{4}}(v)-iJ_{\frac{1}{4}}(v)\}dv\right|^2 \quad (3)$$

where $$v_3=\frac{80}{9\pi}\frac{\rho_1}{\lambda}\left[-\frac{\phi_0}{2}-\frac{9\pi}{160}\frac{\lambda}{\rho_1}\right]^2$$

and $$v_4=\frac{80}{9\pi}\frac{\rho_1}{\lambda}\left[\frac{\phi_0}{2}-\frac{9\pi}{160}\frac{\lambda}{\rho_1}\right]^2$$

Fig. 34 represents a series of curves where the ordinates are $P_{0,1}$ and the abscissae are the flare angle $\phi_0$ as determined by Equation 2 for different values of $$\frac{\rho_1}{\lambda}$$

with $$\frac{a}{\lambda}=1$$

Fig. 53 is similarly a series of plots represented by Equation 3. In these curves, it will be noticed that $$\frac{dP_{0,1}}{d\phi_0}=0$$

represents maxima, instead of minima, and similar considerations apply to the derivatives of $P_{0,1}$ with respect to other variables. In some cases, it should be observed, these curves have more than one maximum, in successively decreasing order, so that the last-written equation should be understood as representing that maximum that has the smallest root. According to Fig. 34, an optimum flare angle, providing, this time, maximum power gain, exists likewise for a horn of a given length $\rho_1$. The maxima occur at smaller flare angles for increasing lengths of horn, and the magnitudes of the maximum power gain increase with increasing length $\rho_1$.

Similar considerations apply to Fig. 35, which corresponds similarly to Fig. 32.

Fig. 35 shows, therefore, the variation of power gain with the horizontal dimension $b$ of the horn aperture. As the power gain is directly proportional to the vertical dimension $a$ of the horn mouth or aperture, if the abscissae $b$ were multiplied by $$\frac{a}{\lambda}$$

these curves would show the variation of power gain with the transmission area of the mouth of the horn. The gain is clearly not a simple function of the horn-mouth area. Quite enormous power gains may clearly be obtained. For a horn length $$\frac{\rho_1}{\lambda} = 50$$

for example, having an optimum flare angle of 14° and a vertical aperture $$\frac{a}{\lambda} = 10$$

the power gain is 720. A horn of these dimensions is entirely feasible and of moderate size at wave-lengths of, say, 10 centimeters.

The peaks of the curves in Figs. 34 and 35 provide optimum design conditions on a power-gain basis.

The curves of Fig. 36 permit specifying, for both the $H_{0,1}$ and $H_{1,0}$ waves, optimum horn dimensions for a given power gain, and supplement the curve of Fig. 33. It gives information as to the optimum design for a horn to provide a given power gain; it specifies the shortest horn and the associated value of flare angle $\phi_0$ that will provide a power gain. These values are specified in two curves, corresponding to both the $H_{0,1}$ and $H_{1,0}$ waves.

So much for the $H_{0,1}$ wave. Horizontal radiation patterns corresponding to Figs. 14 to 29 or the $H_{1,0}$ wave are given in Figs. 37 to 52. Radiation pattern for the $H_{1,0}$ wave in the XZ plane, i. e. the horizontal pattern, is given by the expression:

$$|E| = \left| B \frac{3}{8\sqrt{10\pi}} \frac{a}{\rho}(1+\cos\phi) \left[ \int_{w_1}^{w_2} \tfrac{1}{2}\{J_{-\frac{1}{4}}(w) - iJ_{\frac{1}{4}}(w)\} dw \right. \right.$$
$$\left. \left. + \int_{w_3}^{w_4} \tfrac{1}{2}\{J_{-\frac{1}{4}}(w) - iJ_{\frac{1}{4}}(w)\} dw \right] \right| \quad (4)$$

where $$w_1 = \frac{80}{9\pi} \frac{\rho_1}{\lambda} \left[ -\frac{\phi_0}{2} - \phi - \frac{9\pi}{160} \frac{\lambda}{\rho_1} \right]^2$$

$$w_2 = \frac{80}{9\pi} \frac{\rho_1}{\lambda} \left[ +\frac{\phi_0}{2} - \phi - \frac{9\pi}{160} \frac{\lambda}{\rho_1} \right]^2$$

$$w_3 = \frac{80}{9\pi} \frac{\rho_1}{\lambda} \left[ -\frac{\phi_0}{2} - \phi + \frac{9\pi}{160} \frac{\lambda}{\rho_1} \right]^2$$

$$w_4 = \frac{80}{9\pi} \frac{\rho_1}{\lambda} \left[ +\frac{\phi_0}{2} - \phi + \frac{9\pi}{160} \frac{\lambda}{\rho_1} \right]^2$$

The same general trends are found in Figs. 37 to 52 as in Figs. 14 to 29 for the $H_{0,1}$ wave, but the order of magnitude of the secondary peaks in the patterns is considerably greater with the $H_{1,0}$ waves. For horns of equal length $\rho_1$, increasing the flare angle $\phi_0$, from a small value will, at first, sharpen the principal part of the beam and increase the magnitude of the secondary peaks. For sufficiently large flare-angle values, these secondary peaks become larger than the principal beam, with the result that the beam becomes broader as the flare angle is increased. For horns of constant flare angle $\phi_0$, the tendency is also observed for the beam to broaden as the length $\rho_1$ of the horn is increased. For sufficiently great lengths $\rho_1$, however, the width of the beam is substantially equal in magnitude to the flare angle.

The explanation of the exaggerated secondary peaks in the pattern of the $H_{1,0}$ wave lies in the uniform distribution of the field across the horn mouth in the horizontal direction and the abrupt discontinuity at the edges. The irregular shape of the horizontal patterns makes it impractical to define a beam angle for the $H_{1,0}$ wave, so that reference must be had to the actual radiation pattern.

According to a feature of the present invention, therefore, a horn may be provided that, whether or not under optimum conditions, a single-peaked radiation-pattern curve should be provided, substantially smooth, and substantially free of secondary lobes.

As appears from Fig. 4, for example, of the said paper by Barrow and Lewis, the radiation pattern is substantially free of secondary lobes for all flare angles below a certain value. It has been found that this value is approximately the same as that which yields the sharpest beam angle. If a horn is to be designed such that its radiation pattern shall be free from these undesired secondary lobes and shall have a smooth shape, its minimum beam angle should not be exceeded by more than say about twenty per cent of the value determined by the formulas given herein.

This value which should not be substantially exceeded, if a smooth lobe-free beam is to be obtained, may also be stated approximately in terms of power gain. It has been discovered that the smoothness of the beam shape of horns having values that exceed those from maximum power gain is also impaired.

As an illustration, referring to Fig. 30, a horn built for the propagation of the $H_{0,1}$ wave at minimum beam angle may have a length $$\frac{\rho_1}{\lambda}$$

equal to twelve and a flare angle $\phi_0$ equal to thirty degrees. Because the curves of Fig. 30 do not have sharp minima, any value of flare angle $\phi_0$ to within about twenty per cent of this thirty-degree value, say between about twenty-four degrees and thirty-six degrees, will yield a very good beam angle. Horns of this same length to provide a smooth, lobe-free shape should have a flare angle $\phi_0$ less than, say, a value that does not exceed by more than about twenty per cent this thirty-degree value. Any value of the flare angle $\phi_0$, therefore, up to about thirty-six degrees, though not necessarily yielding a minimum beam angle, will provide a smooth, lobe-less beam shape.

To refer, similarly, to Fig. 34, an optimum power gain for a horn of length $$\frac{\rho_1}{\lambda}$$

equal to twelve is also seen to be about thirty degrees. Here, too, a good power gain may be obtained by employing a flare angle $\phi_0$ having a value to within about twenty per cent of this thirty-degree value. A smooth beam shape is, furthermore, assured for a horn of this length having a flare angle the value of which does not exceed, by more than about twenty percent this optimum thirty-six-degree value. Any value of flare angle within about twenty-four to thirty-six degrees, therefore, will yield an optimum power gain and any value up to about thirty-six degrees will yield a smooth lobe-less radiation pattern.

For the $H_{0,1}$ wave in terms of the horizontal aperture $$\frac{b}{\lambda}$$

the same principles apply with reference to Fig. 35. The same principles apply also, referring to Figs. 53 and 54, to the $H_{1,0}$ wave.

The power-gain curves of Figs. 53 and 54, for the $H_{1,0}$ wave, are similar to those of Figs. 34 and 35 for the $H_{0,1}$ wave. The small oscillations of power gain at large flare angles $\phi_0$ are associated with the shift of the energy from principal lobe to secondary lobes, as described above. The power gain is a linear function of the vertical dimension $$\frac{a}{\lambda}$$

of the horn aperture for the $H_{1,0}$ wave, the same as for the $H_{0,1}$ wave. The optimum design curve, on a power-gain basis, shown in Fig. 36, has already been referred to. The power gain can clearly be indefinitely increased by lengthening the horn and appropriately reducing the flare angle $\phi_0$.

Using a sectoral horn, the $H_{0,1}$ wave, as before explained, yields a clear-cut beam comprising a principal lobe without appreciable secondary lobes, and the beam angle can be well controlled. The $H_{1,0}$ wave, on the other hand, though giving a clear-cut beam for flare angles $\phi_0$ less than those required for maximum power gain, yields an irregular beam for greater angles. Roughly, as may be observed from a study of the computed radiation patterns, the flare angle $\phi_0$ should not exceed by more than, say, about twenty per cent the value necessary for maximum power gain if a smooth beam is to be obtained.

In Fig. 30, the beam angle is plotted against different values of the flare angle $\phi_0$ for different values of the radial horn length $$\frac{\rho_1}{\lambda}$$

corresponding to the $H_{0,1}$ wave. The optimum values of the flare angle $\phi_0$, together with the associated values of the radial horn length $$\frac{\rho_1}{\lambda}$$

are plotted in Fig. 33 against the beam angle. In Fig. 56, these associated values of optimum flare angle $\phi_0$ and radial horn length $$\frac{\rho_1}{\lambda}$$

are plotted directly against each other, in logarithmic coordinates. The minimum value of the flare angle $\phi_0$ corresponding to the value of the radial horn length $$\frac{\rho_1}{\lambda}=6$$

of Fig. 30, for example, is approximately 40°. This is the first point plotted, at the left, in Fig. 56. The minimum value of the flare angle $\phi_0$ corresponding to the value of the radial horn length $$\frac{\rho_1}{\lambda}=8$$

of Fig. 30 is similarly about 35°. This is the third point from the left plotted in Fig. 56. The minimum value of the flare angle $\phi_0$ corresponding to the value of the radial horn length $$\frac{\rho_1}{\lambda}=50$$

may be read off from Fig. 30 as about 15°. This is the last point plotted, at the right in Fig. 56. Many of the points plotted in Fig. 56 correspond to values of radial horn length $$\frac{\rho_1}{\lambda}$$

the corresponding curves of which are omitted from Fig. 30, to prevent crowding. They may, however, be obtained from Fig. 33. The third point from the left plotted in Fig. 56, for example, for a radial horn length $$\frac{\rho_1}{\lambda}=7$$

corresponds to an optimum flare angle $\phi_0$ of about 36°, as may be read off from the top of Fig. 33.

The curve of Fig. 56 turns out to be a straight line the equation of which, when re-transposed from logarithmic into Cartesian coordinates, is approximately $$\phi_0=86\left(\frac{\rho_1}{\lambda}\right)^{-0.45} \text{ degrees}$$

This formula, therefore, gives the associated values of optimum flare angle $\phi_0$ and radial horn length $$\frac{\rho_1}{\lambda}$$

to yield a minimum beam angle.

In Fig. 34, the power gain is plotted against different values of the flare angle $\phi_0$ for different values of the radial horn length $$\frac{\rho_1}{\lambda}$$

for the $H_{0,1}$ wave. The corresponding plots for the $H_{1,0}$ wave are shown in Fig. 53. The optimum values of the flare angle $\phi_0$, together with the associated values of the radial horn length $$\frac{\rho_1}{\lambda}$$

are plotted in Fig. 36 against the power gain. In Fig. 57, these associated values of optimum flare angle $\phi_0$ and radial horn length $$\frac{\rho_1}{\lambda}$$

are plotted directly against each other in logarithmic coordinates. For a maximum power gain, using the $H_{0,1}$ wave, the value of the flare angle $\phi_0$ corresponding to the value of the radial horn length $$\frac{\rho_1}{\lambda}=50$$

for example, is shown in Fig. 34 as approximately about 13°. This is the last point plotted, at the right, in the upper curve of Fig. 57. The corresponding value of the flare angle $\phi_0$ corresponding to the value of the radial horn length $$\frac{\rho_1}{\lambda}=30$$

is similarly shown in Fig. 34 as about 18°. This is the next-to-the-last point plotted, at the right, in the upper curve of Fig. 57. These and the remaining points plotted in the upper curve of Fig. 57 may be taken from the right-hand plot of Fig. 36 as well as Fig. 34.

The lower curve of Fig. 57 may similarly be derived from the left-hand curve of Fig. 36 or from Fig. 53. To obtain the maximum power gain corresponding to the $H_{1,0}$ wave for a value of radial horn length $$\frac{\rho_1}{\lambda}=50$$

one should use a flare angle $\phi_0$ of about 12°. This 12° value corresponds to the uppermost peak of Fig. 53 and to almost the lowermost point of the $H_{1,0}$ curve of Fig. 36, and is plotted as the last point, at the right, of the lower curve of Fig. 57.

It is found that the two curves of Fig. 57, like the curve of Fig. 56, are straight lines that, re-transposed from logarithmic into Cartesian coordinates, may be represented by the respective equations $$\phi_0 = 128\left(\frac{\rho_1}{\lambda}\right)^{-0.57} \text{ degrees}$$

and $$\phi_0 = 86\left(\frac{\rho_1}{\lambda}\right)^{-0.51} \text{ degrees}$$

The former equation yields the optimum values of flare angle $\phi_0$ and associated radial horn length $$\frac{\rho_1}{\lambda}$$

to give maximum power gain for the $H_{0,1}$ wave, and the latter the corresponding values for the $H_{1,0}$ wave.

Fig. 35 differs from Fig. 34 in that the power gain, instead of being plotted against the flare angle $\phi_0$, is plotted against the horizontal aperture $$\frac{b}{\lambda}$$

and Fig. 54 similarly differs from Fig. 53. The curves of Fig. 57 corresponding to those for Figs. 34 and 53, respectively, are shown, for Figs. 35 and 54, in Fig. 58. In the upper curve of Fig. 58 are plotted the values of the horizontal aperture $$\frac{b}{\lambda}$$

and their associated radial horn lengths $$\frac{\rho_1}{\lambda}$$

corresponding to the maximum power gain, as indicated by the peaks of the curves of Fig. 35. As an illustration, the peak for the curve $$\frac{\rho_1}{\lambda} = 6$$

as taken from Fig. 35, corresponds to a maximum power gain of about 4.5. The first point plotted, at the left, on the upper curve of Fig. 58, accordingly has the coordinates plotted logarithmically (6, 4.5). The first point plotted, at the left, on the lower curve of Fig. 58, similarly has the coordinates (6, 3.7); the value 3.7 is the maximum power gain corresponding to the peak of the curve of Fig. 54 in which $$\frac{\rho_1}{\lambda} = 6$$

The two curves of Fig. 58 are likewise found to be straight lines the equations corresponding to which, in Cartesian coordinates, are, for the respective $H_{0,1}$ and $H_{1,0}$ waves, $$\frac{b}{\lambda} = 2.1\left(\frac{\rho_1}{\lambda}\right)^{0.44}$$

and $$\frac{b}{\lambda} = 1.45\left(\frac{\rho_1}{\lambda}\right)^{0.52}$$

Horns of pyramidal shape, the opposite sides of which flare in both the vertical and the horizontal directions, as illustrated in Fig. 2 may be designed by similar analysis. Using a pyramidal horn, operating with an $H_{0,1}$ wave, the power gain $P'$ may be expressed roughly by the expression $$P' = k\frac{a}{\lambda}P_{0,1}$$

where $k$ is a constant, less than unity, depending on the vertical flare angle $\phi_0$ and the radial length $\rho_1$, and $P_{0,1}$ is the power gain for a sectoral horn with the $H_{0,1}$ wave of the same radial length $\rho_1$ and the same flare angle in the XZ plane as the pyramidal horn. For small flare angles in the vertical plane, $k$ will not differ greatly from unity, but for greater such flare angles, it will be substantially less than unity. With an $H_{1,0}$ type of wave in a pyramidal horn, the vertical flare angle should be kept small, if a clear-cut vertical radiation pattern is desired.

In the pyramidal horn of Fig. 2, the lines of electric intensity do not strictly form straight parallel lines between the pair of oppositely disposed top and bottom flaring sides of the horn but form curved lines therebetween. Nevertheless, the flaring sides parallel to the antenna and to the lines of electric intensity at their surfaces, shown as vertical in Fig. 2, will be referred to as a pair of flaring sides substantially parallel to the lines of electric intensity of the waves within the horn, and the other two sides, shown as the top and bottom sides in Fig. 2, will be referred to as a pair of oppositely disposed flaring sides substantially normal to the lines of electric intensity.

Experiments have demonstrated that if the pyramidal horn is used, such as illustrated in Fig. 2, with the horizontal flare angle $\phi_0'$ designed in accordance with Fig. 34 to give a maximum power gain for the particular length $\rho_1$ in the horizontal plane and the vertical flare angle $\phi_0$ designed in accordance with Fig. 53 to give a maximum power gain for the particular length $\rho_1$ in the vertical plane, a smooth beam pattern will be produced. In the vertical plane bisecting the horn, which is parallel to the lines of electric intensity of the waves within the horn, $$\frac{dP_{1,0}}{d\phi_0} = 0$$

and in the horizontal plane bisecting the horn, which is normal to the lines of electric intensity of the waves within the horn, $$\frac{dP_{0,1}}{d\phi_0'} = 0$$

the symbols having the same meaning as before, except that the flare angle in the vertical plane is here represented by $\phi_0'$, the flare angle in the horizontal plane being represented by $\phi_0$. Furthermore, this beam is approximately of the same beam angle in the horizontal and the vertical radiation patterns and has substantially the maximum power gain for a pyramidal horn.

The invention is not limited to the exact embodiments thereof that are illustrated and described herein; further modifications may be made by persons skilled in the art without departing from the spirit and scope of the invention, as defined in the appended claims.

What is claimed is:

1. An electromagnetic horn of sectoral or somewhat pyramidal shape adapted for the propagation therein of the lowest-order, $H_{0,1}$, waves of wave length $\lambda$ having a radial component of magnetic intensity but no radial component of electric intensity in the horn, the horn being provided with a pair of oppositely disposed flaring sides substantially parallel, and a pair of oppositely disposed sides substantially normal, to the lines of electric intensity of the said waves within the horn, the horn having a flare angle $\phi_0$ between the pair of oppositely disposed flaring sides and having a radiation pattern in a plane substantially normal to the lines of electric intensity of the said waves within the horn, and the horn having substantially the shortest length $\rho_1$ determined substantially by the expression $$\frac{d\phi'}{d\rho_1}=0$$

where $\phi'$, as a function of $\phi_0$, substantially satisfies the following equation, corresponding to the said radiation pattern:

$$\left|(1+\cos\phi')\left[e^{i\pi\frac{\phi'}{\phi_0}}\int_{u_1}^{u_2}\tfrac{1}{2}\{J_{-\frac{1}{2}}(u)-iJ_{\frac{1}{2}}(u)\}du+e^{-i\pi\frac{\phi'}{\phi_0}}\int_{u_3}^{u_4}\tfrac{1}{2}\{J_{-\frac{1}{2}}(u)-iJ_{\frac{1}{2}}(u)\}du\right]\right|=$$
$$0.1\left|2\left[\int_{u_1'}^{u_2'}\tfrac{1}{2}\{J_{-\frac{1}{2}}(u)-iJ_{\frac{1}{2}}(u)\}du+\int_{u_3'}^{u_4'}\tfrac{1}{2}\{J_{-\frac{1}{2}}(u)-iJ_{\frac{1}{2}}(u)\}du\right]\right|$$

where $$u_1=\frac{80}{9\pi}\frac{\rho_1}{\lambda}\left[-\frac{\phi_0}{2}-\phi'-\frac{9\pi^2}{160\phi_0}\frac{\lambda}{\rho_1}\right]^2$$

$$u_2=\frac{80}{9\pi}\frac{\rho_1}{\lambda}\left[+\frac{\phi_0}{2}-\phi'-\frac{9\pi^2}{160\phi_0}\frac{\lambda}{\rho_1}\right]^2$$

$$u_3=\frac{80}{9\pi}\frac{\rho_1}{\lambda}\left[-\frac{\phi_0}{2}-\phi'+\frac{9\pi^2}{160\phi_0}\frac{\lambda}{\rho_1}\right]^2$$

$$u_4=\frac{80}{9\pi}\frac{\rho_1}{\lambda}\left[+\frac{\phi_0}{2}-\phi'+\frac{9\pi^2}{160\phi_0}\frac{\lambda}{\rho_1}\right]^2$$

$$u_1'=\frac{80}{9\pi}\frac{\rho_1}{\lambda}\left[-\frac{\phi_0}{2}-\frac{9\pi^2}{160\phi_0}\frac{\lambda}{\rho_1}\right]^2$$

$$u_2'=\frac{80}{9\pi}\frac{\rho_1}{\lambda}\left[+\frac{\phi_0}{2}-\frac{9\pi^2}{160\phi_0}\frac{\lambda}{\rho_1}\right]^2$$

$$u_3'=\frac{80}{9\pi}\frac{\rho_1}{\lambda}\left[-\frac{\phi_0}{2}+\frac{9\pi^2}{160\phi_0}\frac{\lambda}{\rho_1}\right]^2$$

$$u_4'=\frac{80}{9\pi}\frac{\rho_1}{\lambda}\left[+\frac{\phi_0}{2}+\frac{9\pi^2}{160\phi_0}\frac{\lambda}{\rho_1}\right]^2$$

$e$ is the base of the Naperian logarithms, $i=\sqrt{-1}$,
$\pi$ is the ratio of the circumference to the diameter of a circle, and
$J_{-\frac{1}{2}}(u)$ and $J_{\frac{1}{2}}(u)$ denote the Bessel functions of the first kind, of order $-\frac{1}{2}$ and $+\frac{1}{2}$, respectively, and of argument $u$.

2. An electromagnetic horn of sectoral or somewhat pyramidal shape adapted for the propagation therein of the lowest-order, $H_{0,1}$, waves of wave-length $\lambda$ having a radial component of magnetic intensity but no radial component of electric intensity in the horn, the horn being provided with a pair of oppositely disposed flaring sides substantially parallel, and a pair of oppositely disposed sides substantially normal, to the lines of electric intensity of the said waves within the horn, the horn having a flare angle $\phi_0$ between the pair of oppositely disposed flaring sides and having a radiation pattern in a plane substantially normal to the lines of electric intensity of the said waves within the horn, and the horn having an aperture determined substantially by the expression $$\frac{d\phi'}{db}=0$$

where $\phi'$, as a function of $\phi_0$, substantially satisfies the following equation, corresponding to the said radiation pattern:

$$\left|(1+\cos\phi')\left[e^{i\pi\frac{\phi'}{\phi_0}}\int_{u_1}^{u_2}\tfrac{1}{2}\{J_{-\frac{1}{2}}(u)-iJ_{\frac{1}{2}}(u)\}du+e^{-i\pi\frac{\phi'}{\phi_0}}\int_{u_3}^{u_4}\tfrac{1}{2}\{J_{-\frac{1}{2}}(u)-iJ_{\frac{1}{2}}(u)\}du\right]\right|=$$
$$0.1\left|2\left[\int_{u_1'}^{u_2'}\tfrac{1}{2}\{J_{-\frac{1}{2}}(u)-iJ_{\frac{1}{2}}(u)\}du+\int_{u_3'}^{u_4'}\tfrac{1}{2}\{J_{-\frac{1}{2}}(u)-iJ_{\frac{1}{2}}(u)\}du\right]\right|$$

where $$u_1=\frac{80}{9\pi}\frac{\rho_1}{\lambda}\left[-\frac{\phi_0}{2}-\phi'-\frac{9\pi^2}{160\phi_0}\frac{\lambda}{\rho_1}\right]^2$$

$$u_2=\frac{80}{9\pi}\frac{\rho_1}{\lambda}\left[+\frac{\phi_0}{2}-\phi'-\frac{9\pi^2}{160\phi_0}\frac{\lambda}{\rho_1}\right]^2$$

$$u_3=\frac{80}{9\pi}\frac{\rho_1}{\lambda}\left[-\frac{\phi_0}{2}-\phi'+\frac{9\pi^2}{160\phi_0}\frac{\lambda}{\rho_1}\right]^2$$

$$u_4=\frac{80}{9\pi}\frac{\rho_1}{\lambda}\left[+\frac{\phi_0}{2}-\phi'+\frac{9\pi^2}{160\phi_0}\frac{\lambda}{\rho_1}\right]^2$$

$$u_1'=\frac{80}{9\pi}\frac{\rho_1}{\lambda}\left[-\frac{\phi_0}{2}-\frac{9\pi^2}{160\phi_0}\frac{\lambda}{\rho_1}\right]^2$$

$$u_2'=\frac{80}{9\pi}\frac{\rho_1}{\lambda}\left[+\frac{\phi_0}{2}-\frac{9\pi^2}{160\phi_0}\frac{\lambda}{\rho_1}\right]^2$$

$$u_3'=\frac{80}{9\pi}\frac{\rho_1}{\lambda}\left[-\frac{\phi_0}{2}+\frac{9\pi^2}{160\phi_0}\frac{\lambda}{\rho_1}\right]^2$$

$$u_4'=\frac{80}{9\pi}\frac{\rho_1}{\lambda}\left[+\frac{\phi_0}{2}+\frac{9\pi^2}{160\phi_0}\frac{\lambda}{\rho_1}\right]^2$$

$e$ is the base of the Naperian logarithms, $i=\sqrt{-1}$,
$\pi$ is the ratio of the circumference to the diameter of a circle,
$J_{-\frac{1}{2}}(u)$ and $J_{\frac{1}{2}}(u)$ denote the Bessel functions of the first kind, of order $-\frac{1}{2}$ and $+\frac{1}{2}$, respectively, and of argument $u$,
$\rho_1$ is the length of the horn, and
$b$, the distance between the pair of oppositely disposed flaring sides of the horn, at the mouth of the horn, is determined by the equation $$\frac{b}{2}=\rho_1\sin\frac{\phi_0}{2}$$

3. An electromagnetic horn of sectoral or somewhat pyramidal shape adapted for the propagation therein of the lowest-order, $H_{0,1}$, waves of wave-length $\lambda$ having a radial component of magnetic intensity but no radial component of electric intensity in the horn, the horn being provided with a pair of oppositely disposed flaring sides substantially parallel, and a pair of oppositely disposed sides substantially normal, to the lines of electric intensity of the said waves within the horn, the horn having a flare angle $\phi_0$ between the pair of oppositely disposed flaring sides and having a radiation pattern in a plane substantially normal to the lines of electric intensity of the said waves within the horn, and the horn having an aperture the value of which to within about twenty per cent, is determined substantially by the expression $$\frac{d\phi'}{db}=0$$

where $\phi'$, as a function of $\phi_0$, substantially satisfies the following equation, corresponding to the said radiation pattern:

$$\left|(1+\cos\phi')\left[e^{i\pi\frac{\phi'}{\phi_0}}\int_{u_1}^{u_2}\tfrac{1}{2}\{J_{-\frac{1}{2}}(u)-iJ_{\frac{1}{2}}(u)\}du+e^{-i\pi\frac{\phi'}{\phi_0}}\int_{u_3}^{u_4}\tfrac{1}{2}\{J_{-\frac{1}{2}}(u)-iJ_{\frac{1}{2}}(u)\}du\right]\right|=$$

$$0.1\left|2\left[\int_{u'_1}^{u'_2}\tfrac{1}{2}\{J_{-\frac{1}{2}}(u)-iJ_{\frac{1}{2}}(u)\}du+\int_{u'_3}^{u'_4}\tfrac{1}{2}\{J_{-\frac{1}{2}}(u)-iJ_{\frac{1}{2}}(u)\}du\right]\right|$$

where $$u_1=\frac{80}{9\pi}\frac{\rho_1}{\lambda}\left[-\frac{\phi_0}{2}-\phi'-\frac{9\pi^2}{160\phi_0}\frac{\lambda}{\rho_1}\right]^2$$

$$u_2=\frac{80}{9\pi}\frac{\rho_1}{\lambda}\left[+\frac{\phi_0}{2}-\phi'-\frac{9\pi^2}{160\phi_0}\frac{\lambda}{\rho_1}\right]^2$$

$$u_3=\frac{80}{9\pi}\frac{\rho_1}{\lambda}\left[-\frac{\phi_0}{2}-\phi'+\frac{9\pi^2}{160\phi_0}\frac{\lambda}{\rho_1}\right]^2$$

$$u_4=\frac{80}{9\pi}\frac{\rho_1}{\lambda}\left[+\frac{\phi_0}{2}-\phi'+\frac{9\pi^2}{160\phi_0}\frac{\lambda}{\rho_1}\right]^2$$

$$u'_1=\frac{80}{9\pi}\frac{\rho_1}{\lambda}\left[-\frac{\phi_0}{2}-\frac{9\pi^2}{160\phi_0}\frac{\lambda}{\rho_1}\right]^2$$

$$u'_2=\frac{80}{9\pi}\frac{\rho_1}{\lambda}\left[+\frac{\phi_0}{2}-\frac{9\pi^2}{160\phi_0}\frac{\lambda}{\rho_1}\right]^2$$

$$u'_3=\frac{80}{9\pi}\frac{\rho_1}{\lambda}\left[-\frac{\phi_0}{2}+\frac{9\pi^2}{160\phi_0}\frac{\lambda}{\rho_1}\right]^2$$

$$u'_4=\frac{80}{9\pi}\frac{\rho_1}{\lambda}\left[+\frac{\phi_0}{2}+\frac{9\pi^2}{160\phi_0}\frac{\lambda}{\rho_1}\right]^2$$

$e$ is the base of the Naperian logarithms
$i=\sqrt{-1}$,
$\pi$ is the ratio of the circumference to the diameter of a circle,
$J_{-\frac{1}{2}}(u)$ and $J_{\frac{1}{2}}(u)$ denote the Bessel functions of the first kind, of order $-\frac{1}{2}$ and $+\frac{1}{2}$, respectively, and of argument $u$,
$\rho_1$ is the length of the horn, and
$b$, the distance between the pair of oppositely disposed flaring sides of the horn, at the mouth of the horn, is determined by the equation $$\frac{b}{2}=\rho_1\sin\frac{\phi_0}{2}$$

4. An electromagnetic horn of sectoral or somewhat pyramidal shape adapted for the propagation therein of the lowest-order $H_{0,1}$ waves of wave-length $\lambda$ having a radial component of magnetic intensity but no radial component of electric intensity in the horn, the horn being provided with a pair of oppositely disposed flaring sides substantially parallel, and a pair of oppositely disposed sides substantially normal, to the lines of electric intensity of the said waves within the horn, the horn having a flare angle $\phi_0$ between the pair of oppositely disposed flaring sides and having a radiation pattern in a plane substantially normal to the lines of electric intensity of the said waves within the horn, and the horn having an aperture the value of which does not exceed by more than about twenty per cent the value determined substantially by the expression $$\frac{d\phi'}{db}=0$$

where $\phi'$, as a function of $\phi_0$, substantially satisfies the following equation, corresponding to the said radiation pattern:

$$\left|(1+\cos\phi')\left[e^{i\pi\frac{\phi'}{\phi_0}}\int_{u_1}^{u_2}\tfrac{1}{2}\{J_{-\frac{1}{2}}(u)-iJ_{\frac{1}{2}}(u)\}du+e^{-i\pi\frac{\phi'}{\phi_0}}\int_{u_3}^{u_4}\tfrac{1}{2}\{J_{-\frac{1}{2}}(u)-iJ_{\frac{1}{2}}(u)\}du\right]\right|=$$

$$0.1\left|2\left[\int_{u'_1}^{u'_2}\tfrac{1}{2}\{J_{-\frac{1}{2}}(u)-iJ_{\frac{1}{2}}(u)\}du+\int_{u'_3}^{u'_4}\tfrac{1}{2}\{J_{-\frac{1}{2}}(u)-iJ_{\frac{1}{2}}(u)\}du\right]\right|$$

where $$u_1=\frac{80}{9\pi}\frac{\rho_1}{\lambda}\left[-\frac{\phi_0}{2}-\phi'-\frac{9\pi^2}{160\phi_0}\frac{\lambda}{\rho_1}\right]^2$$

$$u_2=\frac{80}{9\pi}\frac{\rho_1}{\lambda}\left[+\frac{\phi_0}{2}-\phi'-\frac{9\pi^2}{160\phi_0}\frac{\lambda}{\rho_1}\right]^2$$

$$u_3=\frac{80}{9\pi}\frac{\rho_1}{\lambda}\left[-\frac{\phi_0}{2}-\phi'+\frac{9\pi^2}{160\phi_0}\frac{\lambda}{\rho_1}\right]^2$$

$$u_4=\frac{80}{9\pi}\frac{\rho_1}{\lambda}\left[+\frac{\phi_0}{2}-\phi'+\frac{9\pi^2}{160\phi_0}\frac{\lambda}{\rho_1}\right]^2$$

$$u'_1=\frac{80}{9\pi}\frac{\rho_1}{\lambda}\left[-\frac{\phi_0}{2}-\frac{9\pi^2}{160\phi_0}\frac{\lambda}{\rho_1}\right]^2$$

$$u'_2=\frac{80}{9\pi}\frac{\rho_1}{\lambda}\left[+\frac{\phi_0}{2}-\frac{9\pi^2}{160\phi_0}\frac{\lambda}{\rho_1}\right]^2$$

$$u'_3=\frac{80}{9\pi}\frac{\rho_1}{\lambda}\left[-\frac{\phi_0}{2}+\frac{9\pi^2}{160\phi_0}\frac{\lambda}{\rho_1}\right]^2$$

$$u'_4=\frac{80}{9\pi}\frac{\rho_1}{\lambda}\left[+\frac{\phi_0}{2}+\frac{9\pi^2}{160\phi_0}\frac{\lambda}{\rho_1}\right]^2$$

$e$ is the base of the Naperian logarithms,
$i=\sqrt{-1}$,
$\pi$ is the ratio of the circumference to the diameter of a circle,
$J_{-\frac{1}{2}}(u)$ and $J_{\frac{1}{2}}(u)$ denote the Bessel functions of the first kind, of order $-\frac{1}{2}$ and $+\frac{1}{2}$, respectively, and of argument $u$,
$\rho_1$ is the length of the horn, and
$b$, the distance between the pair of oppositely disposed flaring sides of the horn, at the mouth of the horn, is determined by the equation $$\frac{b}{2}=\rho_1\sin\frac{\phi_0}{2}$$

5. An electromagnetic horn of sectoral or somewhat pyramidal shape adapted for the propagation therein of the lowest-order, $H_{0,1}$, waves of wave-length $\lambda$ having a radial component of magnetic intensity but no radial component of electric intensity in the horn, the horn being provided with a pair of oppositely disposed flaring sides substantially parallel, and a pair of oppositely disposed sides substantially normal, to the lines of electric intensity of the said waves within the horn, the horn having a radiation pattern in a plane substantially normal to the lines of electric intensity of the said waves within the horn, and the horn having a flare angle $\phi_0$ between the pair of oppositely disposed flaring sides determined substantially by the expression $$\frac{d\phi'}{d\phi_0}=0$$

where $\phi'$, as a function of $\phi_0$, substantially satisfies the following equation, corresponding to the said radiation pattern:

$$\left|(1+\cos\phi')\left[e^{i\pi\frac{\phi'}{\phi_0}}\int_{u_1}^{u_2}\tfrac{1}{2}\{J_{-\frac{1}{2}}(u)-iJ_{\frac{1}{2}}(u)\}du+e^{-i\pi\frac{\phi'}{\phi_0}}\int_{u_3}^{u_4}\tfrac{1}{2}\{J_{-\frac{1}{2}}(u)-iJ_{\frac{1}{2}}(u)\}du\right]\right|=$$
$$0.1\left|2\left[\int_{u'_1}^{u'_2}\tfrac{1}{2}\{J_{-\frac{1}{2}}(u)-iJ_{\frac{1}{2}}(u)\}du+\int_{u'_3}^{u'_4}\tfrac{1}{2}\{J_{-\frac{1}{2}}(u)-iJ_{\frac{1}{2}}(u)\}du\right]\right|$$

where $$u_1=\frac{80}{9\pi}\frac{\rho_1}{\lambda}\left[-\frac{\phi_0}{2}-\phi'-\frac{9\pi^2}{160\phi_0}\frac{\lambda}{\rho_1}\right]^2$$

$$u_2=\frac{80}{9\pi}\frac{\rho_1}{\lambda}\left[+\frac{\phi_0}{2}-\phi'-\frac{9\pi^2}{160\phi_0}\frac{\lambda}{\rho_1}\right]^2$$

$$u_3=\frac{80}{9\pi}\frac{\rho_1}{\lambda}\left[-\frac{\phi_0}{2}-\phi'+\frac{9\pi^2}{160\phi_0}\frac{\lambda}{\rho_1}\right]^2$$

$$u_4=\frac{80}{9\pi}\frac{\rho_1}{\lambda}\left[+\frac{\phi_0}{2}-\phi'+\frac{9\pi^2}{160\phi_0}\frac{\lambda}{\rho_1}\right]^2$$

$$u'_1=\frac{80}{9\pi}\frac{\rho_1}{\lambda}\left[-\frac{\phi_0}{2}-\frac{9\pi^2}{160\phi_0}\frac{\lambda}{\rho_1}\right]^2$$

$$u'_2=\frac{80}{9\pi}\frac{\rho_1}{\lambda}\left[+\frac{\phi_0}{2}-\frac{9\pi^2}{160\phi_0}\frac{\lambda}{\rho_1}\right]^2$$

$$u'_3=\frac{80}{9\pi}\frac{\rho_1}{\lambda}\left[-\frac{\phi_0}{2}+\frac{9\pi^2}{160\phi_0}\frac{\lambda}{\rho_1}\right]^2$$

$$u'_4=\frac{80}{9\pi}\frac{\rho_1}{\lambda}\left[+\frac{\phi_0}{2}+\frac{9\pi^2}{160\phi_0}\frac{\lambda}{\rho_1}\right]^2$$

$e$ is the base of the Naperian logarithms,
$i=\sqrt{-1}$,
$\pi$ is the ratio of the circumference to the diameter of a circle,
$J_{-\frac{1}{2}}(u)$ and $J_{\frac{1}{2}}(u)$ denote the Bessel functions of the first kind, of order $-\frac{1}{2}$ and $+\frac{1}{2}$, respectively, and of argument $u$, and
$\rho_1$ is the length of the horn.

6. An electromagnetic horn of sectoral or somewhat pyramidal shape adapted for the propagation therein of the lowest-order, $H_{0,1}$, waves of wave-length $\lambda$ having a radial component of magnetic intensity but no radial component of electric intensity in the horn, the horn being provided with a pair of oppositely disposed flaring sides substantially parallel, and a pair of oppositely disposed sides substantially normal, to the lines of electric intensity of the said waves within the horn, the horn having a radiation pattern in a plane substantially normal to the lines of electric intensity of the said waves within the horn, and the horn having a flare angle $\phi_0$ between the pair of oppositely disposed flaring sides the value of which, to within about twenty per cent, is determined substantially by the expression $$\frac{d\phi'}{d\phi_0}=0$$

where $\phi'$, as a function of $\phi_0$, substantially satisfies the following equation, corresponding to the said radiation pattern:

$$\left|(1+\cos\phi')\left[e^{i\pi\frac{\phi'}{\phi_0}}\int_{u_1}^{u_2}\tfrac{1}{2}\{J_{-\frac{1}{2}}(u)-iJ_{\frac{1}{2}}(u)\}du+e^{-i\pi\frac{\phi'}{\phi_0}}\int_{u_3}^{u_4}\tfrac{1}{2}\{J_{-\frac{1}{2}}(u)-iJ_{\frac{1}{2}}(u)\}du\right]\right|=$$
$$0.1\left|2\left[\int_{u'_1}^{u'_2}\tfrac{1}{2}\{J_{-\frac{1}{2}}(u)-iJ_{\frac{1}{2}}(u)\}du+\int_{u'_3}^{u'_4}\tfrac{1}{2}\{J_{-\frac{1}{2}}(u)-iJ_{\frac{1}{2}}(u)\}du\right]\right|$$

where $$u_1=\frac{80}{9\pi}\frac{\rho_1}{\lambda}\left[-\frac{\phi_0}{2}-\phi'-\frac{9\pi^2}{160\phi_0}\frac{\lambda}{\rho_1}\right]^2$$

$$u_2=\frac{80}{9\pi}\frac{\rho_1}{\lambda}\left[+\frac{\phi_0}{2}-\phi'-\frac{9\pi^2}{160\phi_0}\frac{\lambda}{\rho_1}\right]^2$$

$$u_3=\frac{80}{9\pi}\frac{\rho_1}{\lambda}\left[-\frac{\phi_0}{2}-\phi'+\frac{9\pi^2}{160\phi_0}\frac{\lambda}{\rho_1}\right]^2$$

$$u_4=\frac{80}{9\pi}\frac{\rho_1}{\lambda}\left[+\frac{\phi_0}{2}-\phi'+\frac{9\pi^2}{160\phi_0}\frac{\lambda}{\rho_1}\right]^2$$

$$u'_1=\frac{80}{9\pi}\frac{\rho_1}{\lambda}\left[-\frac{\phi_0}{2}-\frac{9\pi^2}{160\phi_0}\frac{\lambda}{\rho_1}\right]^2$$

$$u'_2=\frac{80}{9\pi}\frac{\rho_1}{\lambda}\left[+\frac{\phi_0}{2}-\frac{9\pi^2}{160\phi_0}\frac{\lambda}{\rho_1}\right]^2$$

$$u'_3=\frac{80}{9\pi}\frac{\rho_1}{\lambda}\left[-\frac{\phi_0}{2}+\frac{9\pi^2}{160\phi_0}\frac{\lambda}{\rho_1}\right]^2$$

$$u'_4=\frac{80}{9\pi}\frac{\rho_1}{\lambda}\left[+\frac{\phi_0}{2}+\frac{9\pi^2}{160\phi_0}\frac{\lambda}{\rho_1}\right]^2$$

$e$ is the base of the Naperian logarithms,
$i=\sqrt{-1}$,
$\pi$ is the ratio of the circumference to the diameter of a circle,
$J_{-\frac{1}{2}}(u)$ and $J_{\frac{1}{2}}(u)$ denote the Bessel functions of the first kind, of order $-\frac{1}{2}$ and $+\frac{1}{2}$, respectively, and of argument $u$, and
$\rho_1$ is the length of the horn.

7. An electromagnetic horn of sectoral or somewhat pyramidal shape adapted for the propagation therein of the lowest-order, $H_{0,1}$, waves of wave-length $\lambda$ having a radial component of magnetic intensity but no radial component of electric intensity in the horn, the horn being provided with a pair of oppositely disposed flaring sides substantially parallel, and a pair of oppositely disposed sides substantially normal, to the lines of electric intensity of the said waves within the horn, the horn having a radiation pattern in a plane substantially normal to the lines of electric intensity of the said waves within the horn, and the horn having a flare angle $\phi_0$ between the pair of oppositely disposed flaring sides the value of which does not exceed by more than about twenty per cent the value determined substantially by the expression $$\frac{d\phi'}{d\phi_0}=0$$

where $\phi'$, as a function of $\phi_0$, substantially satisfies the following equation, corresponding to the said radiation pattern:

$$\left|(1+\cos\phi')\left[e^{i\pi\frac{\phi'}{\phi_0}}\int_{u_1}^{u_2}\tfrac{1}{2}\{J_{-\frac{1}{2}}(u)-iJ_{\frac{1}{2}}(u)\}du+e^{-i\pi\frac{\phi'}{\phi_0}}\int_{u_3}^{u_4}\tfrac{1}{2}\{J_{-\frac{1}{2}}(u)-iJ_{\frac{1}{2}}(u)\}du\right]\right|=$$

$$0.1\left|2\left[\int_{u'_1}^{u'_2}\tfrac{1}{2}\{J_{-\frac{1}{2}}(u)-iJ_{\frac{1}{2}}(u)\}du+\int_{u'_3}^{u'_4}\tfrac{1}{2}\{J_{-\frac{1}{2}}(u)-iJ_{\frac{1}{2}}(u)\}du\right]\right|$$

where $$u_1=\frac{80}{9\pi}\frac{\rho_1}{\lambda}\left[-\frac{\phi_0}{2}-\phi'-\frac{9\pi^2}{160\phi_0}\frac{\lambda}{\rho_1}\right]^2$$

$$u_2=\frac{80}{9\pi}\frac{\rho_1}{\lambda}\left[+\frac{\phi_0}{2}-\phi'-\frac{9\pi^2}{160\phi_0}\frac{\lambda}{\rho_1}\right]^2$$

$$u_3=\frac{80}{9\pi}\frac{\rho_1}{\lambda}\left[-\frac{\phi_0}{2}-\phi'+\frac{9\pi^2}{160\phi_0}\frac{\lambda}{\rho_1}\right]^2$$

$$u_4=\frac{80}{9\pi}\frac{\rho_1}{\lambda}\left[+\frac{\phi_0}{2}-\phi'+\frac{9\pi^2}{160\phi_0}\frac{\lambda}{\rho_1}\right]^2$$

$$u'_1=\frac{80}{9\pi}\frac{\rho_1}{\lambda}\left[-\frac{\phi_0}{2}-\frac{9\pi^2}{160\phi_0}\frac{\lambda}{\rho_1}\right]^2$$

$$u'_2=\frac{80}{9\pi}\frac{\rho_1}{\lambda}\left[+\frac{\phi_0}{2}-\frac{9\pi^2}{160\phi_0}\frac{\lambda}{\rho_1}\right]^2$$

$$u'_3=\frac{80}{9\pi}\frac{\rho_1}{\lambda}\left[-\frac{\phi_0}{2}+\frac{9\pi^2}{160\phi_0}\frac{\lambda}{\rho_1}\right]^2$$

$$u'_4=\frac{80}{9\pi}\frac{\rho_1}{\lambda}\left[+\frac{\phi_0}{2}+\frac{9\pi^2}{160\phi_0}\frac{\lambda}{\rho_1}\right]^2$$

$e$ is the base of the Naperian logarithms,
$i=\sqrt{-1}$,
$\pi$ is the ratio of the circumference to the diameter of a circle,
$J_{-\frac{1}{2}}(u)$ and $J_{\frac{1}{2}}(u)$ denote the Bessel functions of the first kind, of order $-\frac{1}{2}$ and $+\frac{1}{2}$, respectively, and of argument $u$, and
$\rho_1$ is the length of the horn.

8. An electromagnetic horn of sectoral or somewhat pyramidal shape adapted for the propagation therein of the lowest-order, $H_{0,1}$, waves of wave-length $\lambda$ having a radial component of magnetic intensity but no radial component of electric intensity in the horn, the horn being provided with a pair of oppositely disposed flaring sides substantially parallel, and a pair of oppositely disposed sides substantially normal, to the lines of electric intensity of the said waves within the horn, the horn having a length $\rho_1$ and a flare angle $\phi_0$ between the pair of oppositely disposed flaring sides determined substantially by the relation $$\phi_0=86\left(\frac{\rho_1}{\lambda}\right)^{-0.45}\text{ degrees}$$

9. An electromagnetic horn of sectoral or somewhat pyramidal shape adapted for the propagation therein of the lowest-order, $H_{0,1}$, waves of wave-length $\lambda$ having a radial component of magnetic intensity but no radial component of electric intensity in the horn, the horn being provided with a pair of oppositely disposed flaring sides substantially parallel, and a pair of oppositely disposed sides substantially normal, to the lines of electric intensity of the said waves within the horn, the horn having a length $\rho_1$ and a flare angle $\phi_0$ between the pair of oppositely disposed flaring sides determined substantially by the relation $$\phi_0=128\left(\frac{\rho_1}{\lambda}\right)^{-0.57}\text{ degrees}$$

10. An electromagnetic horn of sectoral or somewhat pyramidal shape adapted for the propagation therein of the lowest-order, $H_{1,0}$, waves of wave-length $\lambda$ having a radial component of magnetic intensity but no radial component of electric intensity in the horn, the horn being provided with a pair of oppositely disposed flaring sides substantially normal, and a pair of oppositely disposed sides substantially parallel, to the lines of electric intensity of the said waves within the horn, the horn having a length $\rho_1$ and a flare angle $\phi_0$ between the pair of oppositely disposed flaring sides determined substantially by the relation $$\phi_0=86\left(\frac{\rho_1}{\lambda}\right)^{-0.51}\text{ degrees}$$

11. An electromagnetic horn of sectoral or somewhat pyramidal shape adapted for the propagation therein of the lowest-order, $H_{0,1}$, waves of wave-length $\lambda$ having a radial component of magnetic intensity but no radial component of electric intensity in the horn, the horn being provided with a pair of oppositely disposed flaring sides substantially parallel, and a pair of oppositely disposed sides substantially normal, to the lines of electric intensity of the said waves within the horn, the horn having a length $\rho_1$ and a distance $b$ between the pair of oppositely disposed flaring sides of the horn, at the mouth of the horn, determined substantially by the relation $$\frac{b}{\lambda}=2.1\left(\frac{\rho_1}{\lambda}\right)^{0.44}$$

12. An electromagnetic horn of sectoral or somewhat pyramidal shape adapted for the propagation therein of the lowest-order, $H_{1,0}$, waves of wave-length $\lambda$ having a radial component of magnetic intensity but no radial component of electric intensity in the horn, the horn being provided with a pair of oppositely disposed flaring sides substantially normal, and a pair of oppositely disposed sides substantially parallel, to the lines of electric intensity of the said waves within the horn, the horn having a length $\rho_1$ and a distance $b$ between the pair of oppositely disposed flaring sides of the horn, at the mouth of the horn, determined substantially by the relation $$\frac{b}{\lambda} = 1.45 \left(\frac{\rho_1}{\lambda}\right)^{0.52}$$

13. An electromagnetic horn of sectoral or somewhat pyramidal shape adapted for the propagation therein of the lowest-order, $H_{0,1}$, waves of wave-length $\lambda$ having a radial component of magnetic intensity but no radial component of electric intensity in the horn, the horn being provided with a pair of oppositely disposed flaring sides substantially parallel, and a pair of oppositely disposed sides substantially normal, to the lines of electric intensity of the said waves within the horn, and the horn having a length $\rho_1$ and a radiation pattern in a plane substantially normal to the lines of electric intensity of the said waves within the horn, the ratio $$\frac{\rho_1}{\lambda}$$

being the smallest value determined substantially by the expression $$\frac{d\phi'}{d\frac{\rho_1}{\lambda}} = 0$$

where $\phi'$, as a function of $\phi_0$, the flare angle of the horn, substantially satisfies the following equation, corresponding to the said radiation pattern:

$$\left|(1+\cos\phi')\left[e^{i\pi\frac{\phi'}{\phi_0}}\int_{u_1}^{u_2}\tfrac{1}{2}\{J_{-\frac{1}{2}}(u)-iJ_{\frac{1}{2}}(u)\}du + e^{-i\pi\frac{\phi'}{\phi_0}}\int_{u_3}^{u_4}\tfrac{1}{2}\{J_{-\frac{1}{2}}(u)-iJ_{\frac{1}{2}}(u)\}du\right]\right| = 0.1\left|2\left[\int_{u_1'}^{u_2'}\tfrac{1}{2}\{J_{-\frac{1}{2}}(u)-iJ_{\frac{1}{2}}(u)\}du + \int_{u_3'}^{u_4'}\tfrac{1}{2}\{J_{-\frac{1}{2}}(u)-iJ_{\frac{1}{2}}(u)\}du\right]\right|$$

where $$u_1 = \frac{80}{9\pi}\frac{\rho_1}{\lambda}\left[-\frac{\phi_0}{2}-\phi'-\frac{9\pi^2}{160\phi_0}\frac{\lambda}{\rho_1}\right]^2$$

$$u_2 = \frac{80}{9\pi}\frac{\rho_1}{\lambda}\left[+\frac{\phi_0}{2}-\phi'-\frac{9\pi^2}{160\phi_0}\frac{\lambda}{\rho_1}\right]^2$$

$$u_3 = \frac{80}{9\pi}\frac{\rho_1}{\lambda}\left[-\frac{\phi_0}{2}-\phi'+\frac{9\pi^2}{160\phi_0}\frac{\lambda}{\rho_1}\right]^2$$

$$u_4 = \frac{80}{9\pi}\frac{\rho_1}{\lambda}\left[+\frac{\phi_0}{2}-\phi'+\frac{9\pi^2}{160\phi_0}\frac{\lambda}{\rho_1}\right]^2$$

$$u_1' = \frac{80}{9\pi}\frac{\rho_1}{\lambda}\left[-\frac{\phi_0}{2}-\frac{9\pi^2}{160\phi_0}\frac{\lambda}{\rho_1}\right]^2$$

$$u_2' = \frac{80}{9\pi}\frac{\rho_1}{\lambda}\left[+\frac{\phi_0}{2}-\frac{9\pi^2}{160\phi_0}\frac{\lambda}{\rho_1}\right]^2$$

$$u_3' = \frac{80}{9\pi}\frac{\rho_1}{\lambda}\left[-\frac{\phi_0}{2}+\frac{9\pi^2}{160\phi_0}\frac{\lambda}{\rho_1}\right]^2$$

$$u_4' = \frac{80}{9\pi}\frac{\rho_1}{\lambda}\left[+\frac{\phi_0}{2}+\frac{9\pi^2}{160\phi_0}\frac{\lambda}{\rho_1}\right]^2$$

$e$ is the base of the Naperian logarithms,
$i = \sqrt{-1}$,
$\pi$ is the ratio of the circumference to the diameter of a circle, and
$J_{-\frac{1}{2}}(u)$ and $J_{\frac{1}{2}}(u)$ denote the Bessel functions of the first kind, of order $-\frac{1}{2}$ and $+\frac{1}{2}$, respectively, and of argument $u$.

14. An electromagnetic horn of sectoral or somewhat pyramidal shape adapted for the propagation therein of the lowest-order, $H_{0,1}$, waves of wave-length $\lambda$ having a radial component of magnetic intensity but no radial component of electric intensity in the horn, the horn being provided with a pair of oppositely disposed flaring sides substantially parallel, and a pair of oppositely disposed sides substantially normal, to the lines of electric intensity of the said waves within the horn, the horn having a flare angle $\phi_0$ between the pair of oppositely disposed flaring sides, and the horn having substantially the shortest length $\rho_1$ determined substantially by the expression $$\frac{dP_{0,1}}{d\rho_1} = 0$$

where $P_{0,1}$, as a function of $\phi_0$, substantially satisfies the following equation:

$$P_{0,1} = \frac{3\pi^3}{160\phi_0}\frac{a}{\lambda}\left|2\int_{v_1}^{v_2}\{J_{-\frac{1}{2}}(v)-iJ_{\frac{1}{2}}(v)\}dv\right|^2$$

where $$v_1 = \frac{80}{9\pi}\frac{\rho_1}{\lambda}\left[-\frac{\phi_0}{2}-\frac{9\pi^2}{160\phi_0}\frac{\lambda}{\rho_1}\right]^2$$

$$v_2 = \frac{80}{9\pi}\frac{\rho_1}{\lambda}\left[\frac{\phi_0}{2}-\frac{9\pi^2}{160\phi_0}\frac{\lambda}{\rho_1}\right]^2$$

$i = \sqrt{-1}$,
$\pi$ is the ratio of the circumference to the diameter of a circle,
$J_{-\frac{1}{2}}(v)$ and $J_{\frac{1}{2}}(v)$ denote the Bessel functions of the first kind, of order $-\frac{1}{2}$ and $+\frac{1}{2}$, respectively, and of argument $v$, and $a$ is the distance between the second-named pair of oppositely disposed sides of the horn.

15. An electromagnetic horn of sectoral or somewhat pyramidal shape adapted for the propagation therein of the lowest-order $H_{0,1}$, waves of wave-length $\lambda$ having a radial component of magnetic intensity but no radial component of electric intensity in the horn, the horn being provided with a pair of oppositely disposed flaring sides substantially parallel, and a pair of oppositely disposed sides substantially normal, to the lines of electric intensity of the said waves within the horn, the horn having a flare angle $\phi_0$ between the pair of oppositely disposed flaring sides, and the horn having an aperture determined substantially by the expression $$\frac{dP_{0,1}}{db} = 0$$

where $P_{0,1}$, as a function of $\phi_0$, substantially satisfies the following equation:

$$P_{0,1} = \frac{3\pi^3}{160\phi_0}\frac{a}{\lambda}\left|2\int_{v_1}^{v_2}\{J_{-\frac{1}{2}}(v)-iJ_{\frac{1}{2}}(v)\}dv\right|^2$$

where $$v_1 = \frac{80}{9\pi}\frac{\rho_1}{\lambda}\left[-\frac{\phi_0}{2}-\frac{9\pi^2}{160\phi_0}\frac{\lambda}{\rho_1}\right]^2$$

$$v_2 = \frac{80}{9\pi}\frac{\rho_1}{\lambda}\left[\frac{\phi_0}{2}-\frac{9\pi^2}{160\phi_0}\frac{\lambda}{\rho_1}\right]^2$$

$i = \sqrt{-1}$,
$\pi$ is the ratio of the circumference to the diameter of a circle, $J_{-\frac{1}{2}}(v)$ and $J_{\frac{1}{2}}(v)$ denote the Bessel functions of the first kind, of order $-\frac{1}{2}$ and $+\frac{1}{2}$, respectively, and of argument $v$, $a$ is the distance between the second-named pair of oppositely disposed sides of the horn, $\rho_1$ is the length of the horn, and $b$, the distance between the pair of oppositely disposed flaring sides of the horn, at the mouth of the horn, is determined by the equation $$\frac{b}{2} = \rho_1 \sin \frac{\phi_0}{2}$$

16. An electromagnetic horn of sectoral or somewhat pyramidal shape adapted for the propagation therein of the lowest-order, $H_{0,1}$, waves of wave-length $\lambda$ having a radial component of magnetic intensity but no radial component of electric intensity in the horn, the horn being provided with a pair of oppositely disposed flaring sides substantially parallel, and a pair of oppositely disposed sides substantially normal, to the lines of electric intensity of the said waves within the horn, the horn having a flare angle $\phi_0$ between the pair of oppositely disposed flaring sides, and the horn having an aperture the value of which, to within about twenty per cent, is determined substantially by the expression $$\frac{dP_{0,1}}{db} = 0$$

where $P_{0,1}$, as a function of $\phi_0$, substantially satisfies the following equation:

$$P_{0,1} = \frac{3\pi^3}{160\phi_0} \frac{a}{\lambda} \left| 2\int_{v_1}^{v_2} \{J_{-\frac{1}{2}}(v) - iJ_{\frac{1}{2}}(v)\} dv \right|^2$$

where $$v_1 = \frac{80}{9\pi} \frac{\rho_1}{\lambda} \left[ -\frac{\phi_0}{2} - \frac{9\pi^3}{160\phi_0} \frac{\lambda}{\rho_1} \right]^2$$

$$v_2 = \frac{80}{9\pi} \frac{\rho_1}{\lambda} \left[ \frac{\phi_0}{2} - \frac{9\pi^3}{160\phi_0} \frac{\lambda}{\rho_1} \right]^2$$

$i = \sqrt{-1}$, $\pi$ is the ratio of the circumference to the diameter of a circle, $J_{-\frac{1}{2}}(v)$ and $J_{\frac{1}{2}}(v)$ denote the Bessel functions of the first kind, of order $-\frac{1}{2}$ and $+\frac{1}{2}$, respectively, and of argument $v$, $a$ is the distance between the second-named pair of oppositely disposed sides of the horn, $\rho_1$ is the length of the horn, and $b$, the distance between the pair of oppositely disposed flaring sides of the horn, at the mouth of the horn, is determined by the equation $$\frac{b}{2} = \rho_1 \sin \frac{\phi_0}{2}$$

17. An electromagnetic horn of sectoral or somewhat pyramidal shape adapted for the propagation therein of the lowest-order $H_{0,1}$, waves of wave-length $\lambda$ having a radial component of magnetic intensity but no radial component of electric intensity in the horn, the horn being provided with a pair of oppositely disposed flaring sides substantially parallel, and a pair of oppositely disposed sides substantially normal, to the lines of electric intensity of the said waves within the horn, the horn having a flare angle $\phi_0$ between the pair of oppositely disposed flaring sides, and the horn having an aperture the value of which does not exceed by more than about twenty per cent the value determined substantially by the expression $$\frac{dP_{0,1}}{db} = 0$$

where $P_{0,1}$, as a function of $\phi_0$, substantially satisfies the following equation:

$$P_{0,1} = \frac{3\pi^3}{160\phi_0} \frac{a}{\lambda} \left| 2\int_{v_1}^{v_2} \{J_{-\frac{1}{2}}(v) - iJ_{\frac{1}{2}}(v)\} dv \right|^2$$

where $$v_1 = \frac{80}{9\pi} \frac{\rho_1}{\lambda} \left[ -\frac{\phi_0}{2} - \frac{9\pi^3}{160\phi_0} \frac{\lambda}{\rho_1} \right]^2$$

$$v_2 = \frac{80}{9\pi} \frac{\rho_1}{\lambda} \left[ \frac{\phi_0}{2} - \frac{9\pi^3}{160\phi_0} \frac{\lambda}{\rho_1} \right]^2$$

$i = \sqrt{-1}$, $\pi$ is the ratio of the circumference to the diameter of a circle, $J_{-\frac{1}{2}}(v)$ and $J_{\frac{1}{2}}(v)$ denote the Bessel functions of the first kind, of order $-\frac{1}{2}$ and $+\frac{1}{2}$, respectively, and of argument $v$, $a$ is the distance between the second-named pair of oppositely disposed sides of the horn, $\rho_1$ is the length of the horn, and $b$, the distance between the pair of oppositely disposed flaring sides of the horn, at the mouth of the horn, is determined by the equation $$\frac{b}{2} = \rho_1 \sin \frac{\phi_0}{2}$$

18. An electromagnetic horn of sectoral or somewhat pyramidal shape adapted for the propagation therein of the lowest-order $H_{0,1}$, waves of wave-length $\lambda$ having a radial component of magnetic intensity but no radial component of electric intensity in the horn, the horn being provided with a pair of oppositely disposed flaring sides substantially parallel, and a pair of oppositely disposed sides substantially normal, to the lines of electric intensity of the said waves within the horn, the horn having a flare angle $\phi_0$ between the pair of oppositely disposed flaring sides determined substantially by the expression $$\frac{dP_{0,1}}{d\phi_0} = 0$$

where $P_{0,1}$, as a function of $\phi_0$, substantially satisfies the following equation:

$$P_{0,1} = \frac{3\pi^3}{160\phi_0} \frac{a}{\lambda} \left| 2\int_{v_1}^{v_2} \{J_{-\frac{1}{2}}(v) - iJ_{\frac{1}{2}}(v)\} dv \right|^2$$

where $$v_1 = \frac{80}{9\pi} \frac{\rho_1}{\lambda} \left[ -\frac{\phi_0}{2} - \frac{9\pi^3}{160\phi_0} \frac{\lambda}{\rho_1} \right]^2$$

$$v_2 = \frac{80}{9\pi} \frac{\rho_1}{\lambda} \left[ \frac{\phi_0}{2} - \frac{9\pi^3}{160\phi_0} \frac{\lambda}{\rho_1} \right]^2$$

$i = \sqrt{-1}$, $\pi$ is the ratio of the circumference to the diameter of a circle, $J_{-\frac{1}{2}}(v)$ and $J_{\frac{1}{2}}(v)$ denote the Bessel functions of the first kind, of order $-\frac{1}{2}$ and $+\frac{1}{2}$, respectively, and of argument $v$, $a$ is the distance between the second-named pair of oppositely disposed sides of the horn, and $\rho_1$ is the length of the horn.

19. An electromagnetic horn of sectoral or somewhat pyramidal shape adapted for the propagation therein of the lowest-order $H_{0,1}$, waves of wave-length $\lambda$ having a radial component of magnetic intensity but no radial component of electric intensity in the horn, the horn being provided with a pair of oppositely disposed flaring sides substantially parallel, and a pair of oppositely disposed sides substantially normal, to the lines of electric intensity of the said waves within the horn, the horn having a flare angle $\phi_0$ between the pair of oppositely disposed flaring sides the value of which, to within about twenty per cent, is determined substantially by the expression $$\frac{dP_{0,1}}{d\phi_0}=0$$

where $P_{0,1}$, as a function of $\phi_0$, substantially satisfies the following equation:

$$P_{0,1}=\frac{3\pi^3}{160\phi_0}\frac{a}{\lambda}\left|2\int_{v_1}^{v_2}\{J_{-\frac{1}{2}}(v)-iJ_{\frac{1}{2}}(v)\}dv\right|^2$$

where $$v_1=\frac{80}{9\pi}\frac{\rho_1}{\lambda}\left[-\frac{\phi_0}{2}-\frac{9\pi^2}{160\phi_0}\frac{\lambda}{\rho_1}\right]^2$$

$$v_2=\frac{80}{9\pi}\frac{\rho_1}{\lambda}\left[\frac{\phi_0}{2}-\frac{9\pi^2}{160\phi_0}\frac{\lambda}{\rho_1}\right]^2$$

$i=\sqrt{-1}$,
$\pi$ is the ratio of the circumference to the diameter of a circle,
$J_{-\frac{1}{2}}(v)$ and $J_{\frac{1}{2}}(v)$ denote the Bessel functions of the first kind, of order $-\frac{1}{2}$ and $+\frac{1}{2}$, respectively, and of argument $v$,
$a$ is the distance between the second-named pair of oppositely disposed sides of the horn, and
$\rho_1$ is the length of the horn.

20. An electromagnetic horn of sectoral or somewhat pyramidal shape adapted for the propagation therein of the lowest-order $H_{0,1}$, waves of wave-length $\lambda$ having a radial component of magnetic intensity but no radial component of electric intensity in the horn, the horn being provided with a pair of oppositely disposed flaring sides substantially parallel, and a pair of oppositely disposed sides substantially normal, to the lines of electric intensity of the said waves within the horn, the horn having a flare angle $\phi_0$ between the pair of oppositely disposed flaring sides the value of which does not exceed by more than about twenty per cent the value determined substantially by the expression $$\frac{dP_{0,1}}{d\phi_0}=0$$

where $P_{0,1}$, as a function of $\phi_0$, substantially satisfies the following equation:

$$P_{0,1}=\frac{3\pi^3}{160\phi_0}\frac{a}{\lambda}\left|2\int_{v_1}^{v_2}\{J_{-\frac{1}{2}}(v)-iJ_{\frac{1}{2}}(v)\}dv\right|^2$$

where $$v_1=\frac{80}{9\pi}\frac{\rho_1}{\lambda}\left[-\frac{\phi_0}{2}-\frac{9\pi^2}{160\phi_0}\frac{\lambda}{\rho_1}\right]^2$$

$$v_2=\frac{80}{9\pi}\frac{\rho_1}{\lambda}\left[\frac{\phi_0}{2}-\frac{9\pi^2}{160\phi_0}\frac{\lambda}{\rho_1}\right]^2$$

$i=\sqrt{-1}$,
$\pi$ is the ratio of the circumference to the diameter of a circle,
$J_{-\frac{1}{2}}(v)$ and $J_{\frac{1}{2}}(v)$ denote the Bessel functions of the first kind, of order $-\frac{1}{2}$ and $+\frac{1}{2}$, respectively, and of argument $v$,
$a$ is the distance between the second-named pair of oppositely disposed sides of the horn, and
$\rho_1$ is the length of the horn.

21. An electromagnetic horn of sectoral or somewhat pyramidal shape adapted for the propagation therein of the lowest-order $H_{0,1}$, waves of wave-length $\lambda$ having a radial component of magnetic intensity but no radial component of electric intensity in the horn, the horn being provided with a pair of oppositely disposed flaring sides substantially parallel, and a pair of oppositely disposed sides substantially normal, to the lines of electric intensity of the said waves within the horn, the horn having a flare angle $\phi_0$ between the pair of oppositely disposed flaring sides, the wave-length $\lambda$ being determined substantially by the expression $$\frac{dP_{0,1}}{d\lambda}=0$$

where $P_{0,1}$, as a function of $\phi_0$, substantially satisfies the following equation:

$$P_{0,1}=\frac{3\pi^3}{160\phi_0}\frac{a}{\lambda}\left|2\int_{v_1}^{v_2}\{J_{-\frac{1}{2}}(v)-iJ_{\frac{1}{2}}(v)\}dv\right|^2$$

where $$v_1=\frac{80}{9\pi}\frac{\rho_1}{\lambda}\left[-\frac{\phi_0}{2}-\frac{9\pi^2}{160\phi_0}\frac{\lambda}{\rho_1}\right]^2$$

$$v_2=\frac{80}{9\pi}\frac{\rho_1}{\lambda}\left[\frac{\phi_0}{2}-\frac{9\pi^2}{160\phi_0}\frac{\lambda}{\rho_1}\right]^2$$

$i=\sqrt{-1}$,
$\pi$ is the ratio of the circumference to the diameter of a circle,
$J_{-\frac{1}{2}}(v)$ and $J_{\frac{1}{2}}(v)$ denote the Bessel functions of the first kind, of order $-\frac{1}{2}$ and $+\frac{1}{2}$, respectively, and of argument $v$,
$a$ is the distance between the second-named pair of oppositely disposed sides of the horn, and
$\rho_1$ is the length of the horn.

22. An electromagnetic horn of sectoral or somewhat pyramidal shape adapted for the propagation therein of the lowest-order $H_{0,1}$, waves of wave-length $\lambda$ having a radial component of magnetic intensity but no radial component of electric intensity in the horn, the horn being provided with a pair of oppositely disposed flaring sides substantially parallel, and a pair of oppositely disposed sides substantially normal, to the lines of electric intensity of the said waves within the horn, the horn having a flare angle $\phi_0$ between the pair of oppositely disposed flaring sides, the wave-length $\lambda$ being determined, to within about twenty per cent, substantially by the expression $$\frac{dP_{0,1}}{d\lambda}=0$$

where $P_{0,1}$, as a function of $\phi_0$, substantially satisfies the following equation:

$$P_{0,1}=\frac{3\pi^3}{160\phi_0}\frac{a}{\lambda}\left|2\int_{v_1}^{v_2}\{J_{-\frac{1}{2}}(v)-iJ_{\frac{1}{2}}(v)\}dv\right|^2$$

where $$v_1=\frac{80}{9\pi}\frac{\rho_1}{\lambda}\left[-\frac{\phi_0}{2}-\frac{9\pi^2}{160\phi_0}\frac{\lambda}{\rho_1}\right]^2$$

$$v_2=\frac{80}{9\pi}\frac{\rho_1}{\lambda}\left[\frac{\phi_0}{2}-\frac{9\pi^2}{160\phi_0}\frac{\lambda}{\rho_1}\right]^2$$

$i=\sqrt{-1}$,
$\pi$ is the ratio of the circumference to the diameter of a circle.

J₋ᵢ(v) and Jᵢ(v) denote the Bessel functions of the first kind, of order −½ and +½, respectively, and of argument $v$, $a$ is the distance between the second-named pair of oppositely disposed sides of the horn, and $\rho_1$ is the length of the horn.

23. An electromagnetic horn of sectoral or somewhat pyramidal shape adapted for the propagation therein of the lowest-order $H_{0,1}$ waves of wave-length $\lambda$ having a radial component of magnetic intensity but no radial component of electric intensity in the horn, the horn being provided with a pair of oppositely disposed flaring sides substantially parallel, and a pair of oppositely disposed sides substantially normal, to the lines of electric intensity of the said waves within the horn, the horn having a flare angle $\phi_0$ between the pair of oppositely disposed flaring sides, the wave-length $\lambda$ having a value that is not less, by more than about twenty per cent, than the value determined substantially by the expression $$\frac{dP_{0,1}}{d\lambda}=0$$

where $P_{0,1}$, as a function of $\phi_0$, substantially satisfies the following equation:

$$P_{0,1}=\frac{3\pi^3}{160\phi_0}\frac{a}{\lambda}\left|2\int_{v_1}^{v_2}\{J_{-\frac{1}{2}}(v)-iJ_{\frac{1}{2}}(v)\}dv\right|^2$$

where $$v_1=\frac{80}{9\pi}\frac{\rho_1}{\lambda}\left[-\frac{\phi_0}{2}-\frac{9\pi^2}{160\phi_0}\frac{\lambda}{\rho_1}\right]^2$$

$$v_2=\frac{80}{9\pi}\frac{\rho_1}{\lambda}\left[\frac{\phi_0}{2}-\frac{9\pi^2}{160\phi_0}\frac{\lambda}{\rho_1}\right]^2$$

$i=\sqrt{-1}$, $\pi$ is the ratio of the circumference to the diameter of a circle, $J_{-\frac{1}{2}}(v)$ and $J_{\frac{1}{2}}(v)$ denote the Bessel functions of the first kind, of order −½ and +½, respectively, and of argument $v$, $a$ is the distance between the second-named pair of oppositely disposed sides of the horn, and $\rho_1$ is the length of the horn.

24. An electromagnetic horn of sectoral or somewhat pyramidal shape adapted for the propagation therein of the lowest-order $H_{0,1}$ waves of wave-length $\lambda$ having a radial component of magnetic intensity but no radial component of electric intensity in the horn, the horn being provided with a pair of oppositely disposed flaring sides substantially parallel, and a pair of oppositely disposed sides substantially normal, to the lines of electric intensity of the said waves within the horn, and the horn having a length $\rho_1$, the ratio $$\frac{\rho_1}{\lambda}$$

being the smallest value determined substantially by the expression $$\frac{dP_{0,1}}{d\frac{\rho_1}{\lambda}}=0$$

where $P_{0,1}$, as a function of $\phi_0$, the flare angle of the horn, substantially satisfies the following equation:

$$P_{0,1}=\frac{3\pi^3}{160\phi_0}\frac{a}{\lambda}\left|2\int_{v_1}^{v_2}\{J_{-\frac{1}{2}}(v)-iJ_{\frac{1}{2}}(v)\}dv\right|^2$$

where $$v_1=\frac{80}{9\pi}\frac{\rho_1}{\lambda}\left[-\frac{\phi_0}{2}-\frac{9\pi^2}{160\phi_0}\frac{\lambda}{\rho_1}\right]^2$$

$$v_2=\frac{80}{9\pi}\frac{\rho_1}{\lambda}\left[\frac{\phi_0}{2}-\frac{9\pi^2}{160\phi_0}\frac{\lambda}{\rho_1}\right]^2$$

$i=\sqrt{-1}$, $\pi$ is the ratio of the circumference to the diameter of a circle, $J_{-\frac{1}{2}}(v)$ and $J_{\frac{1}{2}}(v)$ denote the Bessel functions of the first kind, of order −½ and +½, respectively, and of argument $v$, and $a$ is the distance between the second-named pair of oppositely disposed sides of the horn.

25. An electromagnetic horn of sectoral or somewhat pyramidal shape adapted for the propagation therein of the lowest order, $H_{1,0}$, waves of wave-length $\lambda$ having a radial component of magnetic intensity but no radial component of electric intensity in the horn, the horn being provided with a pair of oppositely disposed flaring sides substantially normal, and a pair of oppositely disposed sides substantially parallel, to the lines of electric intensity of the said waves within the horn, the horn having a flare angle $\phi_0$ between the pair of oppositely disposed flaring sides, and the horn having substantially the shortest length $\rho_1$ determined substantially by the expression $$\frac{dP_{1,0}}{d\rho_1}=0$$

where $P_{1,0}$, as a function of $\phi_0$, substantially satisfies the following equation:

$$P_{1,0}=\frac{3\pi}{40\phi_0}\frac{a}{\lambda}\left|2\int_{v_3}^{v_4}\{J_{-\frac{1}{2}}(v)-iJ_{\frac{1}{2}}(v)\}dv\right|^2$$

where $$v_3=\frac{80}{9\pi}\frac{\rho_1}{\lambda}\left[-\frac{\phi_0}{2}-\frac{9\pi}{160}\frac{\lambda}{\rho_1}\right]^2$$

$$v_4=\frac{80}{9\pi}\frac{\rho_1}{\lambda}\left[\frac{\phi_0}{2}-\frac{9\pi}{160}\frac{\lambda}{\rho_1}\right]^2$$

$i=\sqrt{-1}$, $\pi$ is the ratio of the circumference to the diameter of a circle, $J_{-\frac{1}{2}}(v)$ and $J_{\frac{1}{2}}(v)$ denote the Bessel functions of the first kind, or order −½ and +½, respectively, and of argument $v$, $a$ is the distance between the second-named pair of oppositely disposed sides of the horn.

26. An electromagnetic horn of sectoral or somewhat pyramidal shape adapted for the propagation therein of the lowest order, $H_{1,0}$, waves of wave-length $\lambda$ having a radial component of magnetic intensity but no radial component of electric intensity in the horn, the horn being provided with a pair of oppositely disposed flaring sides substantially normal, and a pair of oppositely disposed sides substantially parallel, to the lines of electric intensity of the said waves within the horn, the horn having a flare angle $\phi_0$ between the pair of oppositely disposed flaring sides, and the horn having an aperture determined substantially by the expression $$\frac{dP_{1,0}}{db}=0$$

where $P_{1,0}$, as a function of $\phi_0$, substantially satisfies the following equation:

$$P_{1,0}=\frac{3\pi}{40\phi_0}\frac{a}{\lambda}\left|2\int_{v_3}^{v_4}\{J_{-\frac{1}{2}}(v)-iJ_{\frac{1}{2}}(v)\}dv\right|^2$$

where $$v_3=\frac{80}{9\pi}\frac{\rho_1}{\lambda}\left[-\frac{\phi_0}{2}-\frac{9\pi}{160}\frac{\lambda}{\rho_1}\right]^2$$

$$v_4=\frac{80}{9\pi}\frac{\rho_1}{\lambda}\left[\frac{\phi_0}{2}-\frac{9\pi}{160}\frac{\lambda}{\rho_1}\right]^2$$

$i=\sqrt{-1}$, $\pi$ is the ratio of the circumference to the diameter of a circle, $J_{-\frac{1}{2}}(v)$ and $J_{\frac{1}{2}}(v)$ denote the Bessel functions of the first kind, of order $-\frac{1}{2}$ and $+\frac{1}{2}$, respectively, and of argument $v$, $a$ is the distance between the second-named pair of oppositely disposed sides of the horn, $\rho_1$ is the length of the horn, and $b$, the distance between the pair of oppositely disposed flaring sides of the horn, at the mouth of the horn, is determined by the equation $$\frac{b}{2}=\rho_1\sin\frac{\phi_0}{2}$$

27. An electromagnetic horn of sectoral or somewhat pyramidal shape adapted for the propagation therein of the lowest order, $H_{1,0}$, waves of wave-length $\lambda$ having a radial component of magnetic intensity but no radial component of electric intensity in the horn, the horn being provided with a pair of oppositely disposed flaring sides substantially normal, and a pair of oppositely disposed sides substantially parallel, to the lines of electric intensity of the said waves within the horn, the horn having a flare angle $\phi_0$ between the pair of oppositely disposed flaring sides, and the horn having an aperture the value of which, to within about twenty per cent, is determined substantially by the expression $$\frac{dP_{1,0}}{db}=0$$

where $P_{1,0}$, as a function of $\phi_0$, substantially satisfies the following equation:

$$P_{1,0}=\frac{3\pi}{40\phi_0}\frac{a}{\lambda}\left|2\int_{v_3}^{v_4}\{J_{-\frac{1}{2}}(v)-iJ_{\frac{1}{2}}(v)\}dv\right|^2$$

where $$v_3=\frac{80}{9\pi}\frac{\rho_1}{\lambda}\left[-\frac{\phi_0}{2}-\frac{9\pi}{160}\frac{\lambda}{\rho_1}\right]^2$$

$$v_4=\frac{80}{9\pi}\frac{\rho_1}{\lambda}\left[\frac{\phi_0}{2}-\frac{9\pi}{160}\frac{\lambda}{\rho_1}\right]^2$$

$i=\sqrt{-1}$, $\pi$ is the ratio of the circumference to the diameter of a circle, $J_{-\frac{1}{2}}(v)$ and $J_{\frac{1}{2}}(v)$ denote the Bessel functions of the first kind, of order $-\frac{1}{2}$ and $+\frac{1}{2}$, respectively, and of argument $v$, $a$ is the distance between the second-named pair of oppositely disposed sides of the horn, $\rho_1$ is the length of the horn, and $b$, the distance between the pair of oppositely disposed flaring sides of the horn, at the mouth of the horn, is determined by the equation $$\frac{b}{2}=\rho_1\sin\frac{\phi_0}{2}$$

28. An electromagnetic horn of sectoral or somewhat pyramidal shape adapted for the propagation therein of the lowest-order, $H_{1,0}$, waves of wave-length $\lambda$ having a radial component of magnetic intensity but no radial component of electric intensity in the horn, the horn being provided with a pair of oppositely disposed flaring sides substantially normal, and a pair of oppositely disposed sides substantially parallel, to the lines of electric intensity of the said waves within the horn, the horn having a flare angle $\phi_0$ between the pair of oppositely disposed flaring sides, and the horn having an aperture the value of which does not exceed by more than about twenty per cent the value determined substantially by the expression $$\frac{dP_{1,0}}{db}=0$$

where $P_{1,0}$, as a function of $\phi_0$, substantially satisfies the following equation:

$$P_{1,0}=\frac{3\pi}{40\phi_0}\frac{a}{\lambda}\left|2\int_{v_3}^{v_4}\{J_{-\frac{1}{2}}(v)-iJ_{\frac{1}{2}}(v)\}dv\right|^2$$

where $$v_3=\frac{80}{9\pi}\frac{\rho_1}{\lambda}\left[-\frac{\phi_0}{2}-\frac{9\pi}{160}\frac{\lambda}{\rho_1}\right]^2$$

$$v_4=\frac{80}{9\pi}\frac{\rho_1}{\lambda}\left[\frac{\phi_0}{2}-\frac{9\pi}{160}\frac{\lambda}{\rho_1}\right]^2$$

$i=\sqrt{-1}$, $\pi$ is the ratio of the circumference to the diameter of a circle, $J_{-\frac{1}{2}}(v)$ and $J_{\frac{1}{2}}(v)$ denote the Bessel functions of the first kind, of order $-\frac{1}{2}$ and $+\frac{1}{2}$, respectively, and of argument $v$, $a$ is the distance between the second-named pair of oppositely disposed sides of the horn, $\rho_1$ is the length of the horn, and $b$, the distance between the pair of oppositely disposed flaring sides of the horn, at the mouth of the horn, is determined by the equation $$\frac{b}{2}=\rho_1\sin\frac{\phi_0}{2}$$

29. An electromagnetic horn of sectoral or somewhat pyramidal shape adapted for the propagation therein of the lowest order, $H_{1,0}$, waves of wave-length $\lambda$ having a radial component of magnetic intensity but no radial component of electric intensity in the horn, the horn being provided with a pair of oppositely disposed flaring sides substantially normal, and a pair of oppositely disposed sides substantially parallel, to the lines of electric intensity of the said waves within the horn, the horn having a flare angle $\phi_0$ between the pair of oppositely disposed flaring sides determined substantially by the expression $$\frac{dP_{1,0}}{d\phi_0}=0$$

where $P_{1,0}$, as a function of $\phi_0$, substantially satisfies the following equation:

$$P_{1,0}=\frac{3\pi}{40\phi_0}\frac{a}{\lambda}\left|2\int_{v_3}^{v_4}\{J_{-\frac{1}{2}}(v)-iJ_{\frac{1}{2}}(v)\}dv\right|^2$$

where $$v_3=\frac{80}{9\pi}\frac{\rho_1}{\lambda}\left[-\frac{\phi_0}{2}-\frac{9\pi}{160}\frac{\lambda}{\rho_1}\right]^2$$

$$v_4=\frac{80}{9\pi}\frac{\rho_1}{\lambda}\left[\frac{\phi_0}{2}-\frac{9\pi}{160}\frac{\lambda}{\rho_1}\right]^2$$

$i=\sqrt{-1}$,

π is the ratio of the circumference to the diameter of a circle, $J_{-\frac{1}{2}}(v)$ and $J_{\frac{1}{2}}(v)$ denote the Bessel functions of the first kind, of order $-\frac{1}{2}$ and $+\frac{1}{2}$, respectively, and of argument $v$, $a$ is the distance between the second-named pair of oppositely disposed sides of the horn, and $\rho_1$ is the length of the horn.

30. An electromagnetic horn of sectoral or somewhat pyramidal shape adapted for the propagation therein of the lowest order, $H_{1,0}$, waves of wave-length $\lambda$ having a radial component of magnetic intensity but no radial component of electric intensity in the horn, the horn being provided with a pair of oppositely disposed flaring sides substantially normal, and a pair of oppositely disposed sides substantially parallel, to the lines of electric intensity of the said waves within the horn, the horn having a flare angle $\phi_0$ between the pair of oppositely disposed flaring sides the value of which, to within about twenty per cent, is determined substantially by the expression $$\frac{dP_{1,0}}{d\phi_0}=0$$

where $P_{1,0}$, as a function of $\phi_0$, substantially satisfies the following equation:

$$P_{1,0}=\frac{3\pi}{40\phi_0}\frac{a}{\lambda}\left|2\int_{v_3}^{v_4}\{J_{-\frac{1}{2}}(v)-iJ_{\frac{1}{2}}(v)\}dv\right|^2$$

where $$v_3=\frac{80}{9\pi}\frac{\rho_1}{\lambda}\left[-\frac{\phi_0}{2}-\frac{9\pi}{160}\frac{\lambda}{\rho_1}\right]^2$$

$$v_4=\frac{80}{9\pi}\frac{\rho_1}{\lambda}\left[\frac{\phi_0}{2}-\frac{9\pi}{160}\frac{\lambda}{\rho_1}\right]^2$$

$i=\sqrt{-1}$,

π is the ratio of the circumference to the diameter of a circle, $J_{-\frac{1}{2}}(v)$ and $J_{\frac{1}{2}}(v)$ denote the Bessel functions of the first kind, of order $-\frac{1}{2}$ and $+\frac{1}{2}$, respectively, and of argument $v$, $a$ is the distance between the second-named pair of oppositely disposed sides of the horn, and $\rho_1$ is the length of the horn.

31. An electromagnetic horn of sectoral or somewhat pyramidal shape adapted for the propagation therein of the lowest order, $H_{1,0}$, waves of wave-length $\lambda$ having a radial component of magnetic intensity but no radial component of electric intensity in the horn, the horn being provided with a pair of oppositely disposed flaring sides substantially normal, and a pair of oppositely disposed sides substantially parallel, to the lines of electric intensity of the said waves within the horn, the horn having a flare angle $\phi_0$ between the pair of oppositely disposed flaring sides the value of which does not exceed by more than about twenty per cent the value determined substantially by the expression $$\frac{dP_{1,0}}{d\phi_0}=0$$

where $P_{1,0}$, as a function of $\phi_0$, substantially satisfies the following equation:

$$P_{1,0}=\frac{3\pi}{40\phi_0}\frac{a}{\lambda}\left|2\int_{v_3}^{v_4}\{J_{-\frac{1}{2}}(v)-iJ_{\frac{1}{2}}(v)\}dv\right|^2$$

where $$v_3=\frac{80}{9\pi}\frac{\rho_1}{\lambda}\left[-\frac{\phi_0}{2}-\frac{9\pi}{160}\frac{\lambda}{\rho_1}\right]^2$$

$$v_4=\frac{80}{9\pi}\frac{\rho_1}{\lambda}\left[\frac{\phi_0}{2}-\frac{9\pi}{160}\frac{\lambda}{\rho_1}\right]^2$$

$i=\sqrt{-1}$,

π is the ratio of the circumference to the diameter of a circle, $J_{-\frac{1}{2}}(v)$ and $J_{\frac{1}{2}}(v)$ denote the Bessel functions of the first kind, of order $-\frac{1}{2}$ and $+\frac{1}{2}$, respectively, and of argument $v$, $a$ is the distance between the second-named pair of oppositely disposed sides of the horn, and $\rho_1$ is the length of the horn.

32. An electromagnetic horn of sectoral or somewhat pyramidal shape adapted for the propagation therein of the lowest-order, $H_{1,0}$, waves of wave-length $\lambda$ having a radial component of magnetic intensity but no radial component of electric intensity in the horn, the horn being provided with a pair of oppositely disposed flaring sides substantially normal, and a pair of oppositely disposed sides substantially parallel, to the lines of electric intensity of the said waves within the horn, the horn having a flare angle $\phi_0$ between the pair of oppositely disposed flaring sides, the wave-length $\lambda$ being determined substantially by the expression $$\frac{dP_{1,0}}{d\lambda}=0$$

where $P_{1,0}$, as a function of $\phi_0$, substantially satisfies the following equation:

$$P_{1,0}=\frac{3\pi}{40\phi_0}\frac{a}{\lambda}\left|2\int_{v_3}^{v_4}\{J_{-\frac{1}{2}}(v)-iJ_{\frac{1}{2}}(v)\}dv\right|^2$$

where $$v_3=\frac{80}{9\pi}\frac{\rho_1}{\lambda}\left[-\frac{\phi_0}{2}-\frac{9\pi}{160}\frac{\lambda}{\rho_1}\right]^2$$

$$v_4=\frac{80}{9\pi}\frac{\rho_1}{\lambda}\left[\frac{\phi_0}{2}-\frac{9\pi}{160}\frac{\lambda}{\rho_1}\right]^2$$

$i=\sqrt{-1}$,

π is the ratio of the circumference to the diameter of a circle, $J_{-\frac{1}{2}}(v)$ and $J_{\frac{1}{2}}(v)$ denote the Bessel functions of the first kind, of order $-\frac{1}{2}$ and $+\frac{1}{2}$, respectively, and of argument $v$, $a$ is the distance between the second-named pair of oppositely disposed sides of the horn, and $\rho_1$ is the length of the horn.

33. An electromagnetic horn of sectoral or somewhat pyramidal shape adapted for the propagation therein of the lowest-order, $H_{1,0}$, waves of wave-length $\lambda$ having a radial component of magnetic intensity but no radial component of electric intensity in the horn, the horn being provided with a pair of oppositely disposed flaring sides substantially normal, and a pair of oppositely disposed sides substantially parallel, to the lines of electric intensity of the said waves within the horn, the horn having a flare angle $\phi_0$ between the pair of oppositely disposed flaring sides, the wave-length $\lambda$ being determined, to within about twenty per cent, substantially by the expression $$\frac{dP_{1,0}}{d\lambda}=0$$

where $P_{1,0}$, as a function of $\phi_0$, substantially satisfies the following equation:

$$P_{1,0}=\frac{3\pi}{40\phi_0}\frac{a}{\lambda}\left|2\int_{v_3}^{v_4}\{J_{-\frac{1}{2}}(v)-iJ_{\frac{1}{2}}(v)\}dv\right|^2$$

where $$v_3=\frac{80}{9\pi}\frac{\rho_1}{\lambda}\left[-\frac{\phi_0}{2}-\frac{9\pi}{160}\frac{\lambda}{\rho_1}\right]^2$$

$$v_4=\frac{80}{9\pi}\frac{\rho_1}{\lambda}\left[\frac{\phi_0}{2}-\frac{9\pi}{160}\frac{\lambda}{\rho_1}\right]^2$$

$i=\sqrt{-1}$,
$\pi$ is the ratio of the circumference to the diameter of a circle,
$J_{-\frac{1}{2}}(v)$ and $J_{\frac{1}{2}}(v)$ denote the Bessel functions of the first kind, of order $-\frac{1}{2}$ and $+\frac{1}{2}$, respectively, and of argument $v$,
$a$ is the distance between the second-named pair of oppositely disposed sides of the horn, and
$\rho_1$ is the length of the horn.

34. An electromagnetic horn of sectoral or somewhat pyramidal shape adapted for the propagation therein of the lowest-order, $H_{1,0}$, waves of wave-length $\lambda$ having a radial component of magnetic intensity but no radial component of electric intensity in the horn, the horn being provided with a pair of oppositely disposed flaring sides substantially normal, and a pair of oppositely disposed sides substantially parallel, to the lines of electric intensity of the said waves within the horn, the horn having a flare angle $\phi_0$ between the pair of oppositely disposed flaring sides, the wave-length $\lambda$ having a value that is not less, by more than about twenty per cent, than the value determined substantially by the expression $$\frac{dP_{1,0}}{d\lambda}=0$$

where $P_{1,0}$, as a function of $\phi_0$, the flare angle of the horn, substantially satisfies the following equation:

$$P_{1,0}=\frac{3\pi}{40\phi_0}\frac{a}{\lambda}\left|2\int_{v_3}^{v_4}\{J_{-\frac{1}{2}}(v)-iJ_{\frac{1}{2}}(v)\}dv\right|^2$$

where $$v_3=\frac{80}{9\pi}\frac{\rho_1}{\lambda}\left[-\frac{\phi_0}{2}-\frac{9\pi}{160}\frac{\lambda}{\rho_1}\right]^2$$

$$v_4=\frac{80}{9\pi}\frac{\rho_1}{\lambda}\left[\frac{\phi_0}{2}-\frac{9\pi}{160}\frac{\lambda}{\rho_1}\right]^2$$

$i=\sqrt{-1}$,
$\pi$ is the ratio of the circumference to the diameter of a circle,
$J_{-\frac{1}{2}}(v)$ and $J_{\frac{1}{2}}(v)$ denote the Bessel functions of the first kind, of order $-\frac{1}{2}$ and $+\frac{1}{2}$, respectively, and of argument $v$,
$a$ is the distance between the second-named pair of oppositely disposed sides of the horn, and
$\rho_1$ is the length of the horn.

35. An electromagnetic horn of sectoral or somewhat pyramidal shape adapted for the propagation therein of the lowest-order, $H_{1,0}$, waves of wave-length $\lambda$ having a radial component of magnetic intensity but no radial component of electric intensity in the horn, the horn being provided with a pair of oppositely disposed flaring sides substantially normal, and a pair of oppositely disposed sides substantially parallel, to the lines of electric intensity of the said waves within the horn, and the horn having a length $\rho_1$, the ratio $$\frac{\rho_1}{\lambda}$$

being the smallest value determined substantially by the expression $$\frac{dP_{1,0}}{d\frac{\rho_1}{\lambda}}=0$$

where $P_{1,0}$, as a function of $\phi_0$, the flare angle of the horn, substantially satisfies the following equation:

$$P_{1,0}=\frac{3\pi}{40\phi_0}\frac{a}{\lambda}\left|2\int_{v_3}^{v_4}\{J_{-\frac{1}{2}}(v)-iJ_{\frac{1}{2}}(v)\}dv\right|^2$$

where $$v_3=\frac{80}{9\pi}\frac{\rho_1}{\lambda}\left[-\frac{\phi_0}{2}-\frac{9\pi}{160}\frac{\lambda}{\rho_1}\right]^2$$

$$v_4=\frac{80}{9\pi}\frac{\rho_1}{\lambda}\left[\frac{\phi_0}{2}-\frac{9\pi}{160}\frac{\lambda}{\rho_1}\right]^2$$

$i=\sqrt{-1}$,
$\pi$ is the ratio of the circumference to the diameter of a circle,
$J_{-\frac{1}{2}}(v)$ and $J_{\frac{1}{2}}(v)$ denote the Bessel functions of the first kind, of order $-\frac{1}{2}$ and $+\frac{1}{2}$, respectively, and of argument $v$,
$a$ is the distance between the second-named pair of oppositely disposed sides of the horn.

36. An electromagnetic horn of pyramidal shape adapted for the propagation therein of the lowest-order, $H_{0,1}$, waves of wave-length $\lambda$ having a radial component of magnetic intensity but no radial component of electric intensity in the horn, the horn being provided with a first pair of oppositely disposed flaring sides substantially parallel, and a second pair of oppositely disposed flaring sides substantially normal, to the lines of electric intensity of the said waves within the horn, the horn having a length $\rho_1$ and a flare angle $\phi_0$ between the first pair of oppositely disposed flaring sides determined substantially by the expression $$\frac{dP_{1,0}}{d\phi_0}=0$$

where $P_{1,0}$, as a function of $\phi_0$, substantially satisfies the following equation:

$$P_{1,0}=\frac{3\pi}{40\phi_0}\frac{a}{\lambda}\left|2\int_{v_3}^{v_4}\{J_{-\frac{1}{2}}(v)-iJ_{\frac{1}{2}}(v)\}dv\right|^2$$

the horn having also a flare angle $\phi_0'$ between the second pair of oppositely disposed flaring sides determined substantially by the expression $$\frac{dP_{0,1}}{d\phi_0'}=0$$

where $P_{0,1}$, as a function of $\phi_0'$, substantially satisfies the following equation:

$$P_{0,1}=\frac{3\pi^2}{160\phi_0'}\frac{a'}{\lambda}\left|2\int_{v_1}^{v_2}\{J_{-\frac{1}{2}}(v)-iJ_{\frac{1}{2}}(v)\}dv\right|^2$$

where $$v_2=\frac{80}{9\pi}\frac{\rho_1}{\lambda}\left[-\frac{\phi_0}{2}-\frac{9\pi}{160}\frac{\lambda}{\rho_1}\right]^2$$

$$v_4=\frac{80}{9\pi}\frac{\rho_1}{\lambda}\left[\frac{\phi_0}{2}-\frac{9\pi}{160}\frac{\lambda}{\rho_1}\right]^2$$

$$v_1=\frac{80}{9\pi}\frac{\rho_1}{\lambda}\left[-\frac{\phi_0'}{2}-\frac{9\pi^2}{160\phi_0'}\frac{\lambda}{\rho_1}\right]^2$$

$$v_3=\frac{80}{9\pi}\frac{\rho_1}{\lambda}\left[\frac{\phi_0'}{2}-\frac{9\pi^2}{160\phi_0'}\frac{\lambda}{\rho_1}\right]^2$$

$i=\sqrt{-1}$,
$\pi$ is the ratio of the circumference to the diameter of a a circle,
$J_{-\frac{1}{2}}(v)$ and $J_{\frac{1}{2}}(v)$ denote the Bessel functions of the first kind, of order $-\frac{1}{2}$ and $+\frac{1}{2}$, respectively, of arguments $v$,
$a$ is the distance between the first pair of oppositely disposed flaring sides, at the mouth of the horn, and
$a'$ is the distance between the second pair of oppositely disposed flaring sides, at the mouth of the horn.

37. An electromagnetic horn of pyramidal shape adapted for the propagation therein of the lowest-order, $H_{0,1}$, waves of wave-length $\lambda$ having a radial component of magnetic intensity but no radial component of electric intensity in the horn, the horn being provided with a first pair of oppositely disposed flaring sides substantially parallel, and a second pair of oppositely disposed flaring sides substantially normal, to the lines of electric intensity of the said waves within the horn, the horn having a length $\rho_1$ and a flare angle $\phi_0$ between the first pair of oppositely disposed flaring sides the value of which, to within about twenty per cent, is determined substantially by the expression $$\frac{dP_{1,0}}{d\phi_0}=0$$

where $P_{1,0}$, as a function of $\phi_0$, substantially satisfies the following equation:

$$P_{1,0}=\frac{3\pi}{40\phi_0}\frac{a}{\lambda}\left|2\int_{v_3}^{v_4}\{J_{-\frac{1}{2}}(v)-iJ_{\frac{1}{2}}(v)\}dv\right|^2$$

the horn having also a flare angle $\phi_0'$ between the second pair of oppositely disposed flaring sides the value of which is within about twenty per cent of the value determined substantially by the expression $$\frac{dP_{0,1}}{d\phi_0'}=0$$

where $P_{0,1}$, as a function of $\phi_0'$, substantially satisfies the following equation:

$$P_{0,1}=\frac{3\pi^2}{160\phi_0'}\frac{a'}{\lambda}\left|2\int_{v_1}^{v_2}\{J_{-\frac{1}{2}}(v)-iJ_{\frac{1}{2}}(v)\}dv\right|^2$$

where $$v_2=\frac{80}{9\pi}\frac{\rho_1}{\lambda}\left[-\frac{\phi_0}{2}-\frac{9\pi}{160}\frac{\lambda}{\rho_1}\right]^2$$

$$v_4=\frac{80}{9\pi}\frac{\rho_1}{\lambda}\left[\frac{\phi_0}{2}-\frac{9\pi}{160}\frac{\lambda}{\rho_1}\right]^2$$

$$v_1=\frac{80}{9\pi}\frac{\rho_1}{\lambda}\left[-\frac{\phi_0'}{2}-\frac{9\pi^2}{160\phi_0'}\frac{\lambda}{\rho_1}\right]^2$$

$$v_3=\frac{80}{9\pi}\frac{\rho_1}{\lambda}\left[\frac{\phi_0'}{2}-\frac{9\pi^2}{160\phi_0'}\frac{\lambda}{\rho_1}\right]^2$$

$i=\sqrt{-1}$,
$\pi$ is the ratio of the circumference to the diameter of a circle,
$J_{-\frac{1}{2}}(v)$ and $J_{\frac{1}{2}}(v)$ denote the Bessel functions of the first kind, of order $-\frac{1}{2}$ and $+\frac{1}{2}$, respectively, of arguments $v$,
$a$ is the distance between the first pair of oppositely disposed flaring sides, at the mouth of the horn, and
$a'$ is the distance between the second pair of oppositely disposed flaring sides, at the mouth of the horn.

38. An electromagnetic horn of pyramidal shape adapted for the propagation therein of the lowest-order, $H_{0,1}$, waves of wave-length $\lambda$ having a radial component of magnetic intensity but no radial component of electric intensity in the horn, the horn being provided with a first pair of oppositely disposed flaring sides substantially parallel, and a second pair of oppositely disposed flaring sides substantially normal, to the lines of electric intensity of the said waves within the horn, the horn having a length $\rho_1$ and a flare angle $\phi_0$ between the first pair of oppositely disposed flaring sides the value of which does not exceed by more than about twenty per cent the value determined substantially by the expression $$\frac{dP_{1,0}}{d\phi_0}=0$$

where $P_{1,0}$, as a function of $\phi_0$, substantially satisfies the following equation:

$$P_{1,0}=\frac{3\pi}{40\phi_0}\frac{a}{\lambda}\left|2\int_{v_3}^{v_4}\{J_{-\frac{1}{2}}(v)-iJ_{\frac{1}{2}}(v)\}dv\right|^2$$

the horn having also a flare angle $\phi_0'$ between the second pair of oppositely disposed flaring sides the value of which does not exceed about twenty per cent of the value of the flare angle determined substantially by the expression $$\frac{dP_{0,1}}{d\phi_0'}=0$$

where $P_{0,1}$, as a function of $\phi_0'$ substantially satisfies the following equation:

$$P_{0,1}=\frac{3\pi^2}{160\phi_0'}\frac{a'}{\lambda}\left|2\int_{v_1}^{v_2}\{J_{-\frac{1}{2}}(v)-iJ_{\frac{1}{2}}(v)\}dv\right|^2$$

where $$v_3 = \frac{80}{9\pi} \frac{\rho_1}{\lambda} \left[ -\frac{\phi_0}{2} - \frac{9\pi}{160} \frac{\lambda}{\rho_1} \right]^2$$

$$v_4 = \frac{80}{9\pi} \frac{\rho_1}{\lambda} \left[ \frac{\phi_0}{2} - \frac{9\pi}{160} \frac{\lambda}{\rho_1} \right]^2$$

$$v_1 = \frac{80}{9\pi} \frac{\rho_1}{\lambda} \left[ -\frac{\phi_0'}{2} - \frac{9\pi^2}{160\phi_0'} \frac{\lambda}{\rho_1} \right]^2$$

$$v_2 = \frac{80}{9\pi} \frac{\rho_1}{\lambda} \left[ \frac{\phi_0'}{2} - \frac{9\pi^2}{160\phi_0'} \frac{\lambda}{\rho_1} \right]^2$$

$i = \sqrt{-1}$, $\pi$ is the ratio of the circumference to the diameter of a circle, $J_{-\frac{1}{2}}(v)$ and $J_{\frac{1}{2}}(v)$ denote the Bessel functions of the first kind, of order $-\frac{1}{2}$ and $+\frac{1}{2}$, respectively, of arguments $v$, $a$ is the distance between the first pair of oppositely disposed flaring sides, at the mouth of the horn, and $a'$ is the distance between the second pair of oppositely disposed flaring sides, at the mouth of the horn.

39. An electromagnetic horn adapted for the propagation therein of waves of wave-length $\lambda$ and having a flare angle $\phi_0$ and a length $\rho_1$ determined substantially by the relation $$\phi_0 = 86\left(\frac{\rho_1}{\lambda}\right)^{-0.45} \text{ degrees}$$

40. An electromagnetic horn adapted for the propagation therein of waves of wave-length $\lambda$ and having a flare angle $\phi_0$ and a length $\rho_1$ determined substantially by the relation $$\phi_0 = 128\left(\frac{\rho_1}{\lambda}\right)^{-0.57} \text{ degrees}$$

41. An electromagnetic horn adapted for the propagation therein of waves of wave-length $\lambda$ and having a flare angle $\phi_0$ and a length $\rho_1$ determined substantially by the relation $$\phi_0 = 86\left(\frac{\rho_1}{\lambda}\right)^{-0.51} \text{ degrees}$$

42. An electromagnetic horn adapted for the propagation therein of waves of wave-length $\lambda$ and having a flare angle $\phi_0$, a length $\rho_1$ and an aperture of horizontal dimension $b$ determined substantially by the relation $$\frac{b}{\lambda} = 2.1\left(\frac{\rho_1}{\lambda}\right)^{0.44}$$

43. An electromagnetic horn adapted for the propagation therein of waves of wave-length $\lambda$ and having a flare angle $\phi_0$, a length $\rho_1$ and an aperture of horizontal dimension $b$ determined substantially by the relation $$\frac{b}{\lambda} = 1.45\left(\frac{\rho_1}{\lambda}\right)^{0.52}$$

44. An electromagnetic horn of pyramidal shape adapted for the propagation therein of the lowest-order, $H_{0,1}$, waves of wave-length $\lambda$ having a radial component of magnetic intensity but no radial component of electric intensity in the horn, the horn being provided with a first pair of oppositely disposed flaring sides substantially parallel, and a second pair of oppositely disposed flaring sides substantially normal, to the lines of electric intensity of the said waves within the horn, the horn having a length $\rho_1$ and a flare angle $\phi_0$ between the first pair of oppositely disposed flaring sides determined substantially by the relation $$\phi_0 = 86\left(\frac{\rho_1}{\lambda}\right)^{-0.51} \text{ degrees}$$

and the horn having also a flare angle $\phi_0'$ between the second pair of oppositely disposed flaring sides determined substantially by the relation $$\phi_0' = 128\left(\frac{\rho_1}{\lambda}\right)^{-0.57} \text{ degrees}$$

45. An electromagnetic horn of sectoral or somewhat pyramidal shape adapted for the propagation therein of the lowest-order, $H_{0,1}$, waves of wave-length $\lambda$ having a radial component of magnetic intensity but no radial component of electric intensity in the horn, the horn being provided with a pair of oppositely disposed flaring sides substantially parallel, and a pair of oppositely disposed sides substantially normal, to the lines of electric intensity of the said waves within the horn, the horn having a length $\rho_1$ and a flare angle $\phi_0$ between the pair of oppositely disposed flaring sides the value of which, to within about twenty per cent, is determined substantially by the relation $$\phi_0 = 86\left(\frac{\rho_1}{\lambda}\right)^{-0.45} \text{ degrees}$$

46. An electromagnetic horn of sectoral or somewhat pyramidal shape adapted for the propagation therein of the lowest-order, $H_{0,1}$, waves of wave-length $\lambda$ having a radial component of magnetic intensity but no radial component of electric intensity in the horn, the horn being provided with a pair of oppositely disposed flaring sides substantially parallel, and a pair of oppositely disposed sides substantially normal, to the lines of electric intensity of the said waves within the horn, the horn having a length $\rho_1$ and a flare angle $\phi_0$ between the pair of oppositely disposed flaring sides the value of which does not exceed by more than about twenty per cent the value determined substantially by the relation $$\phi_0 = 86\left(\frac{\rho_1}{\lambda}\right)^{-0.45} \text{ degrees}$$

47. An electromagnetic horn of sectoral or somewhat pyramidal shape adapted for the propagation therein of the lowest-order, $H_{0,1}$, waves of wave-length $\lambda$ having a radial component of magnetic intensity but no radial component of electric intensity in the horn, the horn being provided with a pair of oppositely disposed flaring sides substantially parallel, and a pair of oppositely disposed sides substantially normal, to the lines of electric intensity of the said waves within the horn, the horn having a length $\rho_1$ and a flare angle $\phi_0$ between the pair of oppositely disposed flaring sides the value of which, to within about twenty per cent, is determined substantially by the relation $$\phi_0 = 128\left(\frac{\rho_1}{\lambda}\right)^{-0.57} \text{ degrees}$$

48. An electromagnetic horn of sectoral or somewhat pyramidal shape adapted for the propagation therein of the lowest-order, $H_{0,1}$, waves of wave-length $\lambda$ having a radial component of magnetic intensity but no radial component of electric intensity in the horn, the horn being provided with a pair of oppositely disposed flaring sides substantially parallel, and a pair of oppositely disposed sides substantially normal, to the lines of electric intensity of the said waves within the horn, the horn having a length $\rho_1$ and a flare angle $\phi_0$ between the pair of oppositely disposed flaring sides, the value of which does not exceed by more than about twenty per cent the value determined substantially by the relation $$\phi_0 = 128\left(\frac{\rho_1}{\lambda}\right)^{-0.57} \text{ degrees}$$

49. An electromagnetic horn of sectoral or somewhat pyramidal shape adapted for the propagation therein of the lowest-order, $H_{0,1}$, waves of wave-length $\lambda$ having a radial component of magnetic intensity but no radial component of electric intensity in the horn, the horn being provided with a pair of oppositely disposed flaring sides substantially parallel, and a pair of oppositely disposed sides substantially normal, to the lines of electric intensity of the said waves within the horn, the horn having a length $\rho_1$ and a flare angle $\phi_0$ between the pair of oppositely disposed flaring sides, the value of which, to within about twenty per cent, is determined substantially by the relation $$\phi_0 = 86\left(\frac{\rho_1}{\lambda}\right)^{-0.51} \text{ degrees}$$

50. An electromagnetic horn of sectoral or somewhat pyramidal shape adapted for the propagation therein of the lowest-order, $H_{0,1}$, waves of wave-length $\lambda$ having a radial component of magnetic intensity but no radial component of electric intensity in the horn, the horn being provided with a pair of oppositely disposed flaring sides substantially parallel, and a pair of oppositely disposed sides substantially normal, to the lines of electric intensity of the said waves within the horn, the horn having a length $\rho_1$ and a flare angle $\phi_0$ between the pair of oppositely disposed flaring sides, the value of which does not exceed by more than about twenty per cent the value determined substantially by the relation $$\phi_0 = 86\left(\frac{\rho_1}{\lambda}\right)^{-0.51} \text{ degrees}$$

51. An electromagnetic horn of sectoral or somewhat pyramidal shape adapted for the propagation therein of the lowest-order, $H_{0,1}$, waves of wave-length $\lambda$ having a radial component of magnetic intensity but no radial component of electric intensity in the horn, the horn being provided with a pair of oppositely disposed flaring sides substantially parallel, and a pair of oppositely disposed sides substantially normal, to the lines of electric intensity of the said waves within the horn, the horn having a length $\rho_1$ and a distance $b$ between the pair of oppositely disposed flaring sides of the horn, at the mouth of the horn the value of which, to within about twenty per cent, is determined substantially by the relation $$\frac{b}{\lambda} = 2.1\left(\frac{\rho_1}{\lambda}\right)^{0.44}$$

52. An electromagnetic horn of sectoral or somewhat pyramidal shape adapted for the propagation therein of the lowest-order, $H_{0,1}$, waves of wave-length $\lambda$ having a radial component of magnetic intensity but no radial component of electric intensity in the horn, the horn being provided with a pair of oppositely disposed flaring sides substantially parallel, and a pair of oppositely disposed sides substantially normal, to the lines of electric intensity of the said waves within the horn, the horn having a length $\rho_1$ and a distance $b$ between the pair of oppositely disposed flaring sides of the horn, at the mouth of the horn the value of which does not exceed by more than about twenty per cent the value determined substantially by the relation $$\frac{b}{\lambda} = 2.1\left(\frac{\rho_1}{\lambda}\right)^{0.44}$$

53. An electromagnetic horn of sectoral or somewhat pyramidal shape adapted for the propagation therein of the lowest-order, $H_{0,1}$, waves of wave-length $\lambda$ having a radial component of magnetic intensity but no radial component of electric intensity in the horn, the horn being provided with a pair of oppositely disposed flaring sides substantially parallel, and a pair of oppositely disposed sides substantially normal, to the lines of electric intensity of the said waves within the horn, the horn having a length $\rho_1$ and a distance $b$ between the pair of oppositely disposed flaring sides of the horn, at the mouth of the horn the value of which, to within about twenty per cent, is determined substantially by the relation $$\frac{b}{\lambda} = 1.45\left(\frac{\rho_1}{\lambda}\right)^{0.52}$$

54. An electromagnetic horn of sectoral or somewhat pyramidal shape adapted for the propagation therein of the lowest-order, $H_{0,1}$, waves of wave-length $\lambda$ having a radial component of magnetic intensity but no radial component of electric intensity in the horn, the horn being provided with a pair of oppositely disposed flaring sides substantially parallel, and a pair of oppositely disposed sides substantially normal, to the lines of electric intensity of the said waves within the horn, the horn having a length $\rho_1$ and a distance $b$ between the pair of oppositely disposed flaring sides of the horn, at the mouth of the horn the value of which does not exceed by more than about twenty per cent the value determined substantially by the relation $$\frac{b}{\lambda} = 1.45\left(\frac{\rho_1}{\lambda}\right)^{0.52}$$

55. An electromagnetic horn of pyramidal shape adapted for the propagation therein of the lowest-order, $H_{0,1}$, waves of wave-length $\lambda$ having a radial component of magnetic intensity but no radial component of electric intensity in the horn, the horn being provided with a first pair of oppositely disposed flaring sides substantially parallel, and a second pair of oppositely disposed flaring sides substantially normal, to the lines of electric intensity of the said waves within the horn, the horn having a length $\rho_1$ and a flare angle $\phi_0$ between the first pair of oppositely disposed flaring sides the value of which, to within about twenty per cent, is determined substantially by the relation $$\phi_0 = 86\left(\frac{\rho_1}{\lambda}\right)^{-0.51} \text{ degrees}$$

and the horn having also a flare angle $\phi_0'$ between the second pair of oppositely disposed flaring sides the value of which, to within about twenty per cent, is determined substantially by the relation $$\phi_0' = 128\left(\frac{\rho_1}{\lambda}\right)^{-0.57} \text{ degrees}$$

56. An electromagnetic horn of pyramidal shape adapted for the propagation therein of the lowest-order, $H_{0,1}$, waves of wave-length $\lambda$ having a radial component of magnetic intensity but no radial component of electric intensity in the horn, the horn being provided with a first pair of oppositely disposed flaring sides substantially parallel, and a second pair of oppositely disposed flaring sides substantially normal, to the lines of electric intensity of the said waves within the horn, the horn having a length $\rho_1$ and a flare angle $\phi_0$ between the first pair of oppositely disposed flaring sides the value of which does not exceed by more than about twenty per cent the value of the flare angle determined substantially by the relation $$\phi_0 = 86\left(\frac{\rho_1}{\lambda}\right)^{-0.51} \text{ degrees}$$

and the horn having also a flare angle $\phi_0'$ between the second pair of oppositely disposed flaring sides the value of which does not exceed by more than about twenty per cent the value of the flare angle determined substantially by the relation $$\phi_0' = 128\left(\frac{\rho_1}{\lambda}\right)^{-0.57} \text{ degrees}$$

WILMER L. BARROW.